United States Patent
Klein et al.

(10) Patent No.: US 9,367,870 B2
(45) Date of Patent: Jun. 14, 2016

(54) DETERMINING NETWORKED MOBILE DEVICE POSITION AND ORIENTATION FOR AUGMENTED-REALITY WINDOW SHOPPING

(71) Applicants: Udo Klein, Maximiliansau (DE); Jochen Mayerle, Flein (DE); Timo Hoyer, South San Francisco, CA (US); Steffen Tatzel, Nussloc (DE); Sanu Koshy, Chennai (IN)

(72) Inventors: Udo Klein, Maximiliansau (DE); Jochen Mayerle, Flein (DE); Timo Hoyer, South San Francisco, CA (US); Steffen Tatzel, Nussloc (DE); Sanu Koshy, Chennai (IN)

(73) Assignee: SAP SE, Walldorf (DE)

( * ) Notice: Subject to any disclaimer, the term of this patent is extended or adjusted under 35 U.S.C. 154(b) by 680 days.

(21) Appl. No.: 13/646,590

(22) Filed: Oct. 5, 2012

(65) Prior Publication Data

US 2014/0100996 A1  Apr. 10, 2014

(51) Int. Cl.
*G06Q 30/00* (2012.01)
*G06Q 30/06* (2012.01)
*G06T 1/00* (2006.01)

(52) U.S. Cl.
CPC ............. *G06Q 30/0643* (2013.01); *G06T 1/00* (2013.01)

(58) Field of Classification Search
CPC ........... G06Q 30/0601–30/0645; G06Q 30/08; G06T 1/00
USPC ............................................... 705/26.1–27.2
See application file for complete search history.

(56) References Cited

U.S. PATENT DOCUMENTS

| | | | |
|---|---|---|---|
| 7,946,492 B2 | 5/2011 | Rohs | |
| 8,554,639 B2 | 10/2013 | Dollens | |
| 8,606,645 B1 * | 12/2013 | Applefeld | G06Q 30/02 705/14.25 |
| 2007/0127848 A1 * | 6/2007 | Kim | G01C 21/3602 382/305 |
| 2008/0071559 A1 * | 3/2008 | Arrasvuori | 705/1 |
| 2012/0062596 A1 | 3/2012 | Bedi et al. | |
| 2012/0214590 A1 * | 8/2012 | Newhouse et al. | 463/31 |
| 2013/0182858 A1 * | 7/2013 | You | G06F 3/011 381/58 |
| 2014/0100994 A1 | 4/2014 | Tatzel et al. | |
| 2014/0100995 A1 | 4/2014 | Koshy et al. | |
| 2014/0100997 A1 | 4/2014 | Mayerle et al. | |

OTHER PUBLICATIONS

Zhu, W., Charles, B.O., Li, H., & Joo-Hyun Lee. (2008). Design of PromoPad: An automated augmented-reality shopping assistant. Journal of Organizational and End User Computing, 20(3), 41-56. Retrieved from http://search.proquest.com/docview/199899751?accountid=14753.*

* cited by examiner

*Primary Examiner* — Jason Dunham
*Assistant Examiner* — Katherine O'Sullivan
(74) *Attorney, Agent, or Firm* — Mintz Levin Cohn Ferris Glovsky and Popeo, P.C.

(57) ABSTRACT

A consumer user can perform a number of augmented reality shopping operations using a local client shopping application executable on a mobile device. Features related to implementations of the current subject matter can include, but are not limited to, the ability to view an augmented reality depiction of a shopping display using the mobile device and to execute various "e-commerce" functions accessible via the augmented reality depiction. Visual image processing based on one or more inputs from sensors on the mobile device can be used to compute and efficiently provide the two dimensional projection of the three dimensional model to be presented on the screen of the mobile device. Related methods, systems, articles of manufacture, and the like are described.

19 Claims, 17 Drawing Sheets

DETERMINING NETWORKED MOBILE DEVICE POSITION AND ORIENTATION FOR AUGMENTED-REALITY WINDOW SHOPPING

TECHNICAL FIELD

The subject matter described herein relates to features for supporting an augmented-reality shopping experience on a consumer user's mobile device.

BACKGROUND

In current approaches to electronic commerce (also referred to as eCommerce, online commerce, online shopping, web shopping, or the like), buyers can search for products and purchase them if they find what they seek. In some electronic commerce situations, such as for example an online marketplace such as those operated by Etsy.com, eBay.com, or the like, a shopping interaction occurs between a buyer (for example a consumer user of the online marketplace) and a seller (e.g. a retailer). A transaction is typically completed between these parties with the at least implicit assumption by the buyer that the seller will handle providing of a purchased product of expected quality and that the operator of the online marketplace will assist in resolving any issues, such as for example shipping problems or delays, damaged or substandard goods, undisclosed price or merchandise changes, etc., that could otherwise lead to an unsatisfactory transaction.

While such an online marketplace can be useful for many small vendors, other sellers, such as for example store owners or proprietors, may wish to sell their products or services via a mechanism other than an online marketplace host (for example to avoid transaction fees or the like). However, many stores, in particular smaller establishments such as neighborhood stores or other shops that can be present in an urban area, pedestrian zone, or the like, may have a finite shop hours outside of which no sales happen. During times that such a shop is closed for business, there may be potential customers who visit the shop but are only able to view the storefront window display. These potential customers may move on to other open stores to complete their purchases or may even choose to complete one or more transactions via an online or other electronic commerce option in lieu of returning to the store during open business hours.

A relatively recent development in enabling a physical retailer or other seller of services, goods, etc. is the Intelligent Shop Window available from Royal Philips Electronics (Amsterdam, The Netherlands), which can provide shoppers with relevant information related to the products they see through a store window. The information can be triggered ether explicitly by the user through touching an interactive screen mounted on a window, or "intelligently," for example through detection of a shopper's interest in a particular product (e.g. using eye tracking devices or the like). While such an approach can enable a store owner or other responsible party at a retail location to make additional sales and drive customer interest during hours that a retail location is closed, it nonetheless has several drawbacks. For example, one or more sensors must be obtained and configured to detect hand gestures, gaze locations, position of a shopper, and the like, and one or more screens, projectors, and the like must be obtained and configured to display product information to a shopper. Accordingly, this approach can be quite capital intensive, in many cases prohibitively so for a small retailer who typically operates with very low sales margins. Additionally, a person viewing the details of a product on the screen or other projection on the store window generally must do so in view of other shoppers or people who happen to be in the area. This aspect of such systems can raise privacy concerns.

SUMMARY

A consumer user can perform a number of augmented reality shopping operations using a local client shopping application executable on a mobile device. Features related to implementations of the current subject matter can include, but are not limited to, the ability to view an augmented reality depiction of a shopping display using the mobile device and to execute various "e-commerce" functions accessible via the augmented reality depiction. Other features of the current subject matter can relate to preparation of the necessary three dimensional models and two dimensional projections of such models for viewing as an augmented reality view of the shopping display. Vendors can benefit from various data aggregation and consumer incentive features. Visual image processing based on one or more inputs from sensors on the mobile device can be used to compute and efficiently provide the two dimensional projection of the three dimensional model to be presented on the screen of the mobile device.

In one aspect, a method includes narrowing a number of available degrees of freedom relating to a current view of a shopping display being sensed by a camera of the mobile device executing a local client shopping application using data provided by one or more sensors associated with the mobile device, and estimating, based on the narrowed available degrees of freedom and using a computer vision algorithm, a pose and position of the camera relative to a three dimensional model of the shopping display.

The method further includes computing a two dimensional projection of the three dimensional model based on the pose and position of the camera, and rendering a two dimensional picture for presentation via a screen on the mobile device screen. The two dimensional picture includes an augmented reality marker associated with a physical item in the shopping display.

In variations of the current subject matter, one or more additional features, optionally including but not limited to the following, can be included in any feasible combination. The one or more sensors can optionally include at least one of a radio signal triangulation sensor, a global positioning transceiver, a compass sensor, and an accelerometer sensor. The method can optionally further include identifying a most likely shopping display being viewed through a camera associated with the mobile device based the data provided by the one or more sensors; and determining the three dimensional model of the shopping display. Alternatively or in addition, the shopping display can be identified based on a visual or textual encoding of a location code entered into the mobile device via the camera or a textual interface on the mobile device. The two dimensional picture can optionally be presented on the screen of the mobile device. A selection of the augmented reality marker can optionally be receive, for example via a user input on the screen, and, in response to the received selection, an item page corresponding to the physical item can optionally be presented on the screen. The item page can optionally include additional information about at least one of the physical item and a good or service represented by the physical item.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Many cities and towns have a local chamber of commerce, commerce club, or the like whose mission, goal, etc. includes the encouragement, promotion, marketing, etc. of businesses maintained by the communities of that city or town. In addition to individual merchants and other owners, proprietors, franchisees, etc. of physical store locations, such organizations can benefit from an integration of modern software and database management technologies coupled with enhancements in smart phone and other mobile computing platforms that can enable improved promotion, marketing, businesses and attractiveness of local commerce centers from both the local population and tourists visiting a city or town.

Implementations of the current subject matter can support the use of a mobile application (e.g. an "app") executable on a mobile device. In the context of the current application, a "mobile device" can include a smart phone; a cellular phone; a tablet computing device; or any other handheld device that includes or that can be associated with a wireless data communication capability, a display screen, and an apparatus for capturing digital still or moving video images. In this context, the phrase "includes or that can be associated with" can refer to either or both of functionality that is fully integrated within a mobile device (e.g. a built-in camera, wireless transceiver, or the like) and functionality provided by an external device that can be connected to the mobile device, either by a wired or wireless connection (e.g. a Bluetooth camera device, a wireless transceiver connectable via a universal serial bus (USB) interface, an external display monitor device, or the like). A local client shopping application (explained in more detail below) can execute on the mobile device to provide a consumer user of the mobile device with real time information regarding goods or services that they seek through the features of augmented reality, web 2.0 applications, an optionally through leveraging an enterprise resource planning (ERP) or other business software solution backend, which can be accessed over a network (e.g. via cloud computing or the like).

Augmented reality is a live, direct or indirect, view of a physical shopping window whose products are augmented by computer-generated virtual objects like markers, additional product information or dotted lines around real world product. As a result, augmented reality technology can function by enhancing the potential shopper's current perception of products in a shopping display. By contrast, virtual reality just replaces the real world with a simulated one.

Figure 1:
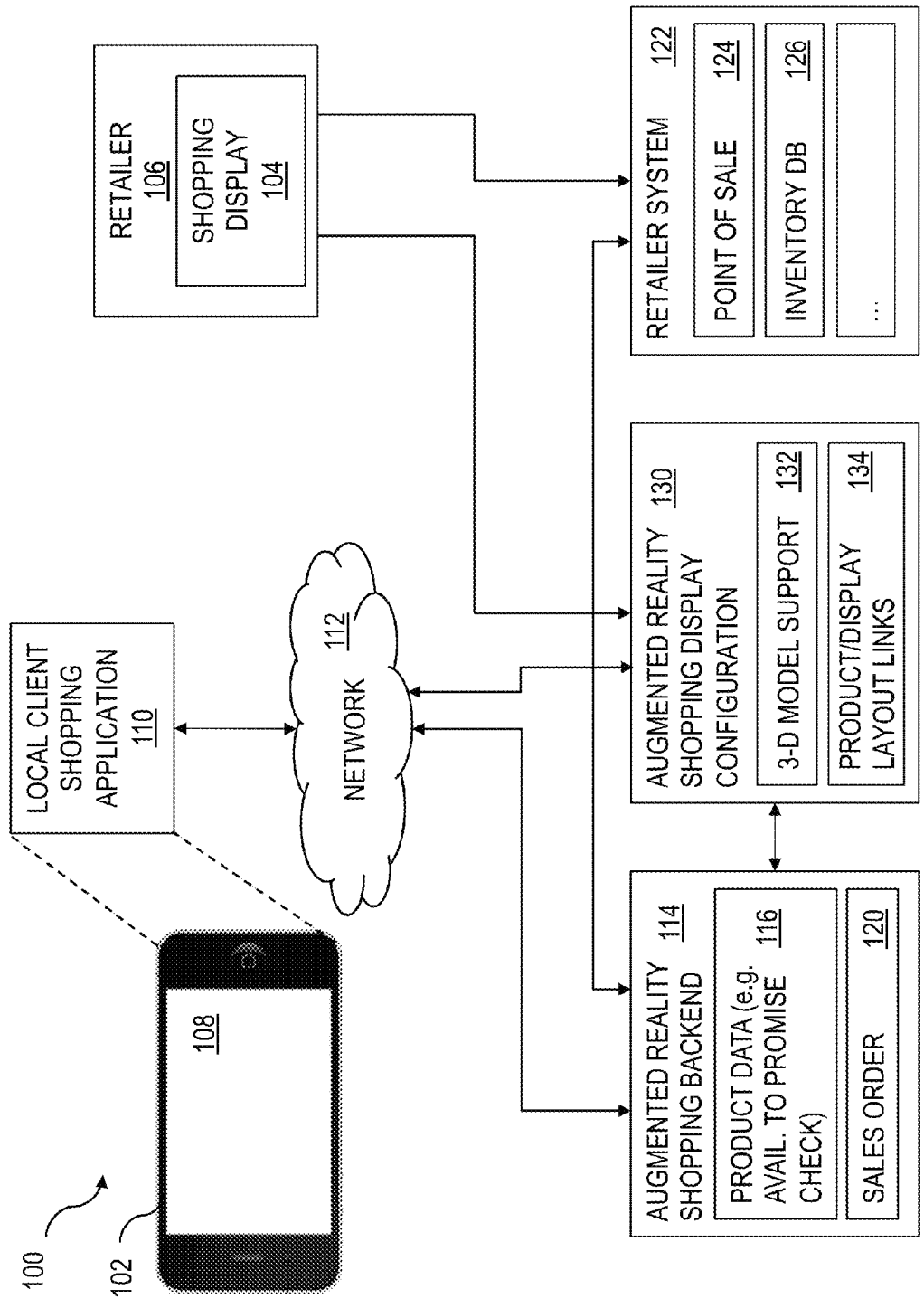
FIG. 1 is a diagram illustrating features of a system architecture via which a consumer user can perform shopping functions using his or her mobile device in conjunction with a shopping display of a commercial entity operator of a physical shopping location.

FIG. 1 shows a diagram illustrating parts of a system architecture 100 that can provide an augmented reality window shopping experience. A consumer user can use a mobile device 102 to enable the consumer user to perform a number of electronic commerce or online shopping functions that are based on an actual store display 104, for example one maintained or otherwise associated with a commercial entity operator of a physical shopping location (referred to herein generically as a "retailer 106"). As used herein, a store display 104 can include one or more of a storefront or other window display or other physical display of goods or items representing goods or services that can be purchased, leased, borrowed, or the like from a retailer 106 or other commercial entity operator of a physical shopping location. A store display 104 can be part of a traditional storefront of a physical shop location or alternatively some other display, which can be located in the interior, on the exterior, or at a remote location to a physical store location.

Consistent with one or more implementations of the current subject matter, the mobile device 102 shown in FIG. 1 can execute a local client shopping application 110 that can support functionality such as a shopping basket or cart, a user purchasing profile (e.g. a shopper identity, payment information, delivery address, etc.), item selection of goods or services represented in a shopping display 104, requests for additional information about a good or service represented in the shopping display 104, information about goods or services related to a good or service represented in a shopping display 104 (e.g. a storefront window display), or the like. Goods or services related to a good or service represented in a shopping display 104 can include, for example, other goods or services offered by the commercial entity operator of a physical shopping location that controls the shopping display 104, other goods or services provided by or otherwise available from by a same maker or vendor as a good or service represented in the shopping display 104, goods or services that are similar to a good or service represented in the shopping display 104, or the like.

As used herein, a local client shopping application 110 can include one or more of an "app" or other software functionality stored locally on a computer-readable storage medium incorporated within or associated with the mobile device, other kinds of software or functionality that is provided at least in part to the mobile device 102 over a communication network 112. A communication network 112 as used herein can include any one or more of a wireless wide area network such as a cellular network, a local wireless network such as a WiFi network provided by one or more hubs (e.g. based on one or more 802.11-based standards or the like), a Bluetooth communication link, or any other kind of wireless approach to sending and receiving data from a mobile device 102. The mobile device 102 can include one or more transceivers operable with the communication protocol or protocols of one or more communication networks 112.

The mobile device 102 can include a screen 108 that can display images as discussed in further detail below. The mobile device 102 can also include or be associated with a camera or other camera-like device capable of receiving light emitted or reflected from physical objects or items as input and converting that input to an image that can be displayed on the screen 108. The mobile device 102 does not show a camera or camera-like device, as this functionality can in many (although not all) examples of a mobile device 102 be positioned on an opposite side of the mobile device 102 from the screen 108. It should be noted that several of the images of mobile devices 102 shown in the figures associated with this application can have one or more physical features similar to the iPhone® available from Apple Computer Inc. of Cupertino, Calif. However, many other examples of mobile devices 102 can also be used in conjunction with one or more implementations of the current subject matter.

The local client shopping application 110 can support one or more of the above-noted functions through cooperation over the one or more networks 112 with an augmented reality shopping backend 114, and can support display on the screen 108 of one or more user interface features relating to shopping (e.g. product information such as size, color, etc.; a shopping basket or cart, an account profile for one or more consumer users, etc.), identification of a specific commercial entity operator of a physical shopping location or other location where the mobile device 102 is located and what the camera or the like of the mobile device is directed at (e.g. what is being viewed by the camera and shown on the screen 108 of the mobile device 102), augmented reality functionality linking a two dimensional image (or series of images) captured by the camera with a matched two dimensional view of an augmented reality three dimensional model of the shopping display 104 being viewed by the camera of the mobile device 102.

Consistent with implementations of the current subject matter, an augmented reality shopping backend 114 can be integrated with or otherwise make use of an enterprise resource planning (ERP) system or other business software architecture by the retailer itself or with the services of a third party. Alternatively, in other implementations of the current subject matter, technical capabilities to create campaigns and advertise an item (e.g. a good or service) provided by existing search engine providers can be leveraged. Search engine technology can also optionally be integrated with an ERP or other business software system. As described in greater detail below, integration of search engine capabilities and ERP or other business software backend features can cause search results returned in response to a search initiated by a consumer user to directly point to a local client shopping application 110 on the mobile device.

As described in greater detail herein, using a local client shopping application 110 executing on a mobile device 102 and in communication with an augmented reality shopping backend 114, a consumer user can use the mobile device 102 to identify and select one or more items or items representative of goods or services from a shopping display 104 and thereby, among other possible functions, assign these selections to a watch list or shopping cart, purchase one or more of the selections, or the like. From the perspective of the consumer user, it can be desirable to be able to readily determine how much the selection costs and whether a desired number of units of the selection are available for immediate purchase (or lease, rent, borrowing, etc.)

While a price of a selection can often be shown in association with an item in a shopping display, a "display" price may not be the actual price that a specific customer, or for that matter, any customer might ultimately pay for that item or for a good or service represented by the item. As an example, one or more discounts (e.g. relating to customer loyalty program activities, friend referrals or recommendations, brand loyalty or manufacturer discounts, discounts given in exchange for a consumer user providing information to the commercial entity, specific sales promotions that are not reflected in a static shopping display, or the like) might be applied at the time of purchase. For such instances, it can be advantageous for a local client on a mobile device 102 to be able to accurately inform a consumer user of the current, actual pricing associated with selection made by the consumer user via the user interface of the mobile device. Additionally, to enable completion of a sale at the time that a consumer user making a buying decision, an availability status of a specific good or service (e.g. a specific size of shoe, an open time slot for a haircut or massage) can be advantageously available in real time via the local client shopping application 110. The price and the availability information can be provided within the local client shopping application 110 itself.

In some implementations of the current subject matter, a system separate from an augmented reality shopping backend 114, such as for example an ERP system or other business software architecture, can calculate price, availability, and optionally other information that can necessary or helpful in completing a sale in real time. Additionally, maintenance of different price lists and discounts can be performed in such a separate system and the result of the price calculation can be requested via services provided by that system. One example of an implementation approach consistent with implementations of the current subject matter can include use of synchronous web services callable by the local client on a mobile device 102.

The augmented reality shopping backend 114 can include functionality relating to one or more of organizational data (e.g. representing each of several commercial entity operators of physical shopping locations as a sales unit or the like), identification data (e.g. barcodes, QR codes, or the like) relating to products (e.g. goods, services, etc.), location assignments to items in the shopping display 104 stored as part of a three dimensional model of the shopping display 104, price lists, account data for one or more consumer users, shipment logistics and returns data, inventories, etc. The augmented reality shopping backend 114 can also include one or more modules or other software functionality relating to an "available to promise" check, for example to provide a real-time response to order inquiries based on availability of inventory necessary to fulfill the order. An available to promise check can return information regarding available quantities of a requested good or service, estimated delivery dates, etc., and can thereby support order promising and fulfillment. The augmented reality shopping backend 114 can also include In support of available to promise functionality 116 and sales order functionality 120, and optionally also in support of other functionality relating to supporting an augmented reality shopping experience via a consumer user's mobile device, the augmented reality shopping backend 114 can also interface (for example over a network connection 112, which can include but is not limited to the Internet) with one or more retailer backend systems 116 associated with or operated by the commercial entity operator of a physical shopping location. The one or more retailer backend systems 116 can optionally include software or other functionality relating to point of sale transactions 124, inventory tracking 126, and the like. The augmented reality shopping backend 114 and the retailer backend system 122 can maintain a synchronization between respective databases relating to inventories and other data that are necessary for the augmented reality shopping backend 114 to present to a mobile device 102 an accurate state of the availability of goods and services that can be obtained by a consumer user using the local client shopping application 110 on the mobile device 102.

One or more additional systems, software modules, or other providers of functionality necessary to support set-up and operation of an augmented reality shopping approach consistent with implementations of the current subject matter can also be included in the system architecture 100. In FIG. 1 and elsewhere in this disclosure, this functionality is referred to generically as augmented reality shopping display configuration module 130. The functions ascribed to augmented reality shopping display configuration module 130 or related modules, etc. can optionally be implemented on a same computing system as any other functionality in the architecture 100 or on a separate computing system accessible via the communication network 112 or other data exchange capabilities. As shown in FIG. 1, augmented reality shopping display configuration module 130 can include for the three dimensional model support 132 necessary to provide an augmented reality view of a shopping display 104 on a screen 108 of a mobile device 102 executing a local client shopping application 110. The augmented reality shopping display configuration module 130 can also include a link management module 134 that handles, stores, etc. links between products (e.g. goods, services, etc.) and the physical layout of a shopping display 104.

In operation, the components of an architecture having one or more features in common can interact in a number of ways. A person or associated with the retailer 106 can work to configure a shopping display 104. As used herein, a person associated with the retailer can be one or more employees, consultants, proprietors, interns, volunteers, co-op members, etc. employed by or otherwise performing work for or on behalf of the retailer 106. Configuring a shopping display can include one or more activities, such as for example designing, arranging, building, assembling, etc. of one or more physical items in an area (e.g. a storefront, other display window, or any other physical feature of a retail location) that is viewable by customers. Typically but not exclusively, the shopping display is visible from outside of the retail location, for example a storefront window that can be viewed from a street, walkway, pedestrian area, etc. even when the retail location is not open for business. Subsequent to the arrangement of the shopping display, a person associated with the retailer 106 can capture image data used to create a three dimensional model representative of the configuration of the shopping display 104. Upon generation of the three dimensional model, a person associated with the retailer 106 can also perform functions that can include identifying specific parts of the three dimensional model as items (e.g. goods, items representative of goods or services, etc.) that are available for a transaction to be performed by a consumer user. The identified parts of the three dimensional model can be used to create an augmented three dimensional model that overlays the three dimensional model and that includes links between items (e.g. products, services, etc. or representations of the same) viewable by a consumer user with the local client shopping application 110 on a mobile device 102 and further activities or information about those items or other related items. Additional details regarding aspect of the current subject matter pertaining to creating a three dimensional model representative of the configuration of the shopping display 104, creating an augmented three dimensional model representative of the augmented reality additions to the first model, and storing links between products and the augmented model are provided below.

When a consumer user approaches a physical location of a retailer 106 that participates in or otherwise offers an augmented reality shopping program, the consumer user can initiate the local client shopping application 110. Alternatively or in addition, the local client shopping application 110 can interface with location determination functionality on the mobile device 102 (e.g. global positioning system, triangulation from one or more terrestrial radio sources or other radiation sources within fixed or known positions, etc.) to provide an indication to the consumer user that a retail location participating in or otherwise offering an augmented reality shopping program is nearby and optionally to provide navigation guidance to assist the consumer user in reaching the retail location by one or more modes of transportation.

A consumer user viewing a shopping display 104 can obtain information about the displayed items, about goods or services represented by the displayed items, and optionally about other goods or services that might be available from the store. To do so, the consumer user can activate a local client shopping application 110 on his or her mobile device 102. The use of a local client shopping application 110 can occur either after retail location closing hours or while the retail location is open. For example, certain customers may choose to use a local client shopping application 110 from outside of a retail location prior to, after, or completely in lieu of entering the retail location and interacting with sales people and physical merchandise.

The local client shopping application 110 can receive information confirming or otherwise indicating that the mobile device 102 is in a position where a camera on or associated with the mobile device can view the shopping display 104. This confirming of the location of the mobile device 102 in view of the shopping display can occur by one or more approaches. In some implementations of the current subject matter, the consumer user can enter a location code into the mobile device. The location code can optionally include an image of a quick response (QR) code or some other scannable pattern or design captured by the camera of the mobile device 102. Alternatively, a textual code or other information can be entered by the consumer user into mobile device 102 for transmission to the backend server. Regardless of the format, the location code can be used to link to the augmented three dimensional model of the shopping display 104.

The QR code or other scannable pattern or design or textual location code can encode readable information about the retail location and can cause the local client shopping application 110 to load at least part of the augmented three dimensional model from the augmented reality shopping display configuration module 130 onto the mobile device 102. Alternatively, and as discussed in greater detail below, location information can be obtained from the mobile device, for example through operation of a location sensing function of the mobile device 102. A location sensing function can include one or more of a radio signal triangulation sensor such as for example a global positioning system (GPS) transceiver, another triangulation system based on one or more signals of known an/or fixed location, or the like.

Figure 2A:
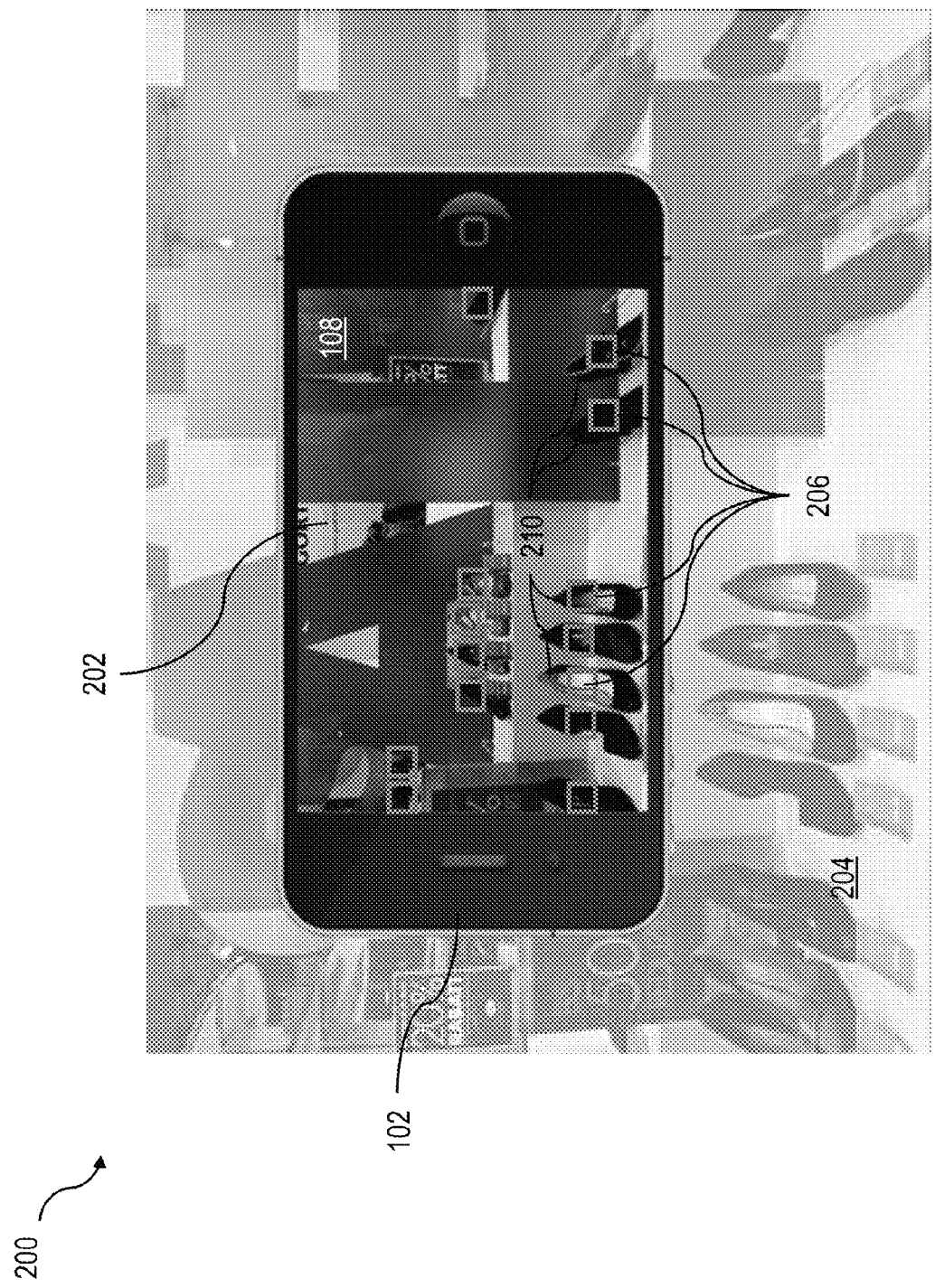
FIG. 2A, FIG. 2B, and FIG. 2C are images showing examples of a mobile device displaying augmented reality views of shopping displays.
Figure 2B:
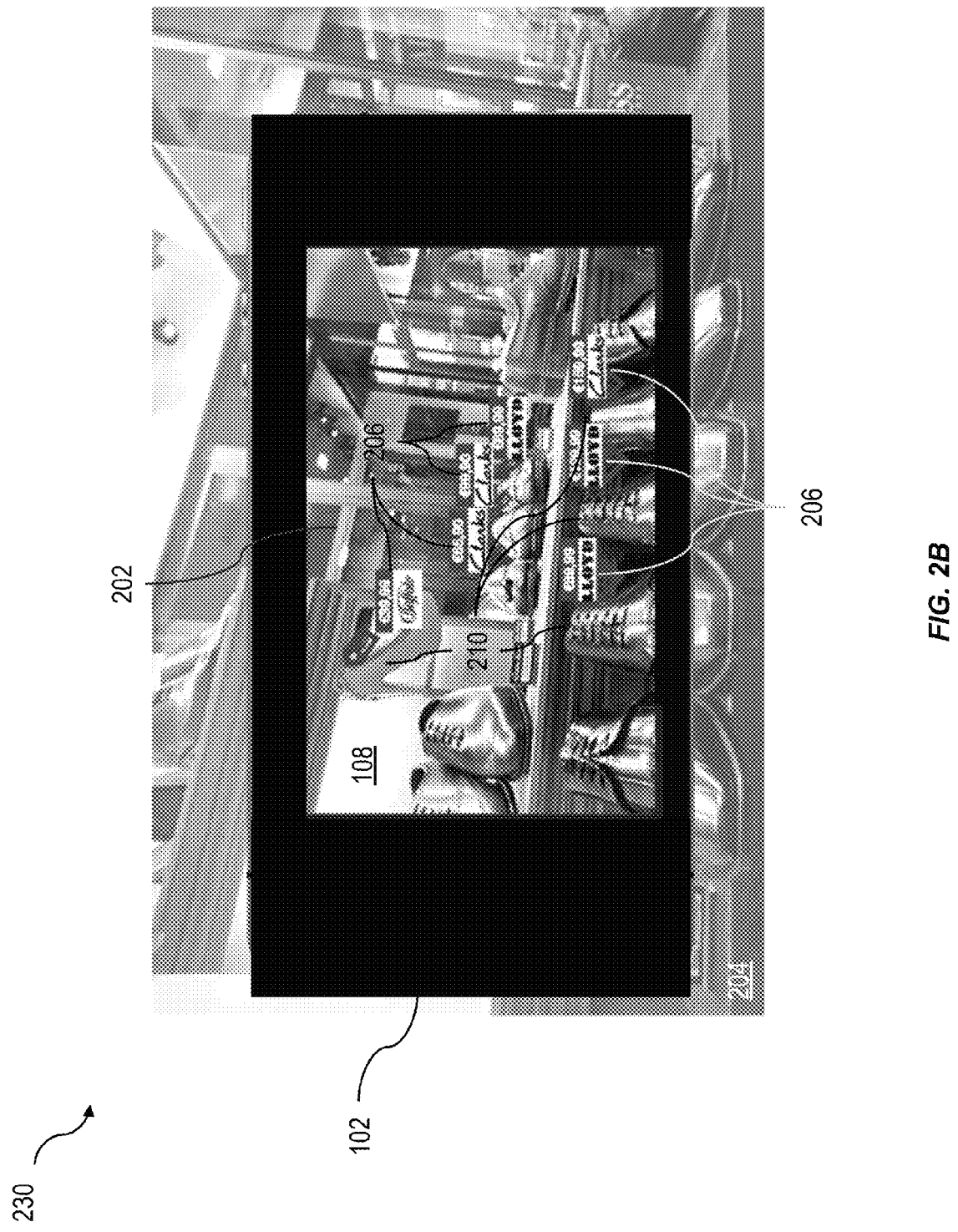
Figure 2C:
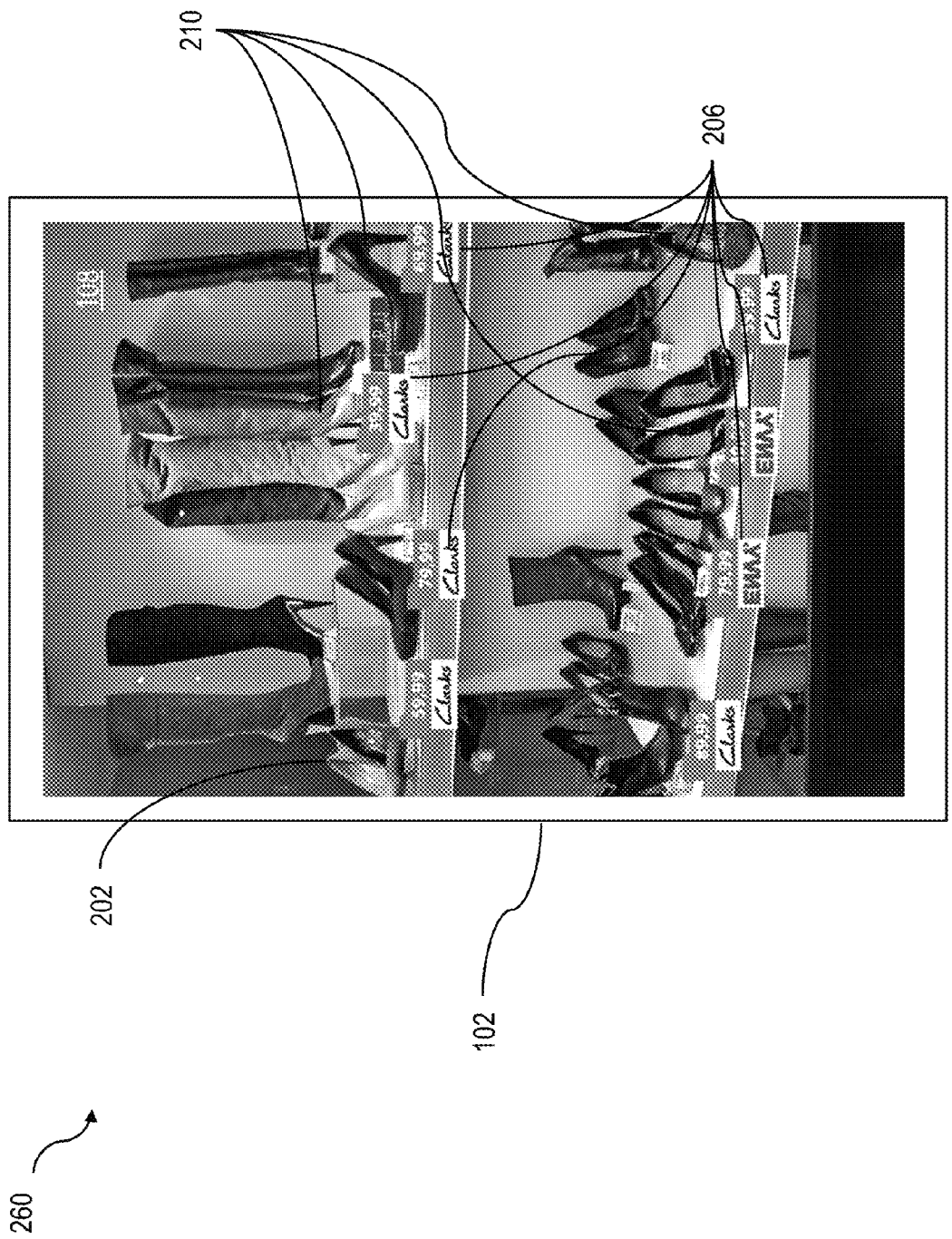
Figure 3:
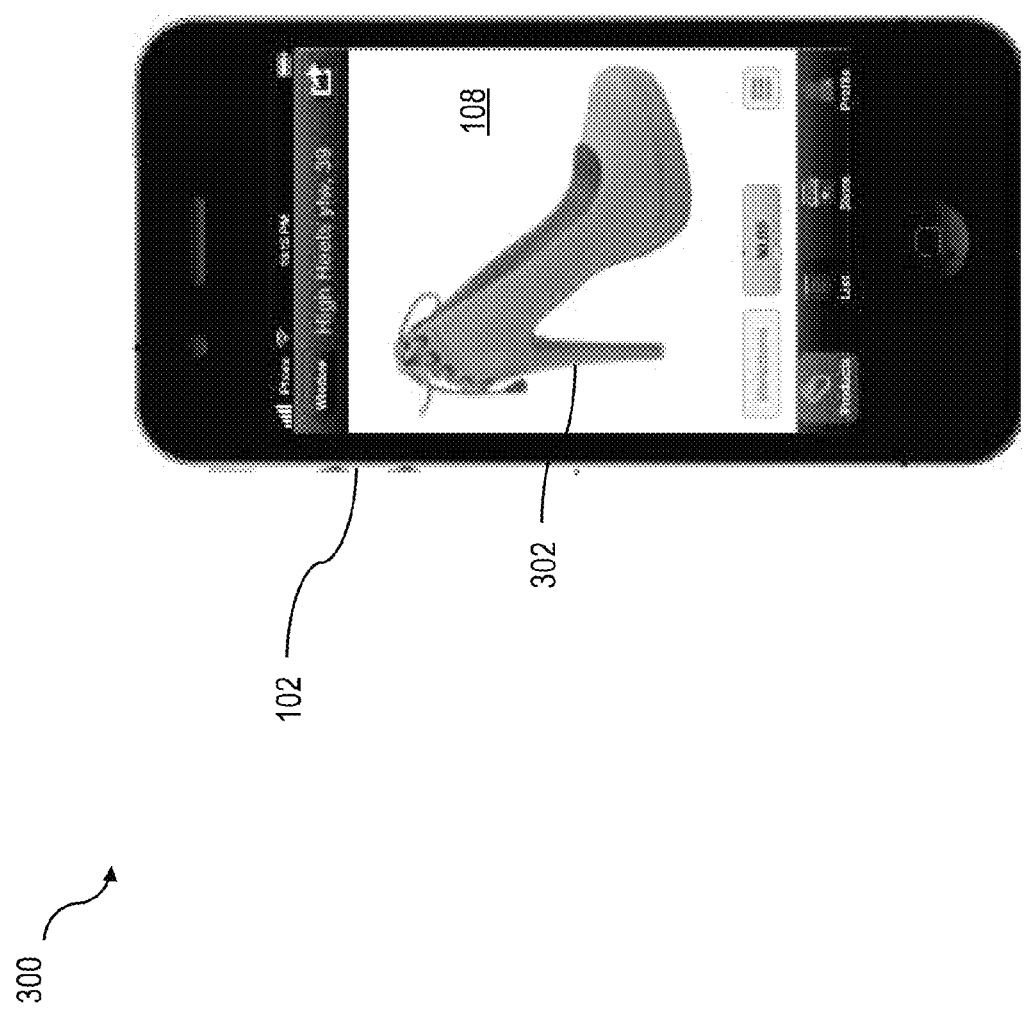
FIG. 3 is a screenshot of a local client shopping application showing features consistent with implementations of the current subject matter.

FIG. 2A, FIG. 2B, and FIG. 2C show images 200, 230, 260 in which a mobile device 102 in the foreground shows an augmented reality view 202 on a screen 108 of the mobile device 102. The local client shopping application 110 can use the first and second three dimensional models, for example as discussed in greater detail below, to create the augmented reality view 202, which includes a two dimensional image combining a current view 204 of the shopping display 104 as captured by the camera of the mobile device 102 overlaid with one or more augmented reality markers 206 that designate specific items 210 shown in the augmented reality view 202 as selectable by the consumer user. Selection of an item, which can optionally occur by one or more of the consumer user tapping on the screen 108 with a finger or stylus (e.g. if the screen 108 is a touch screen); advancing through a series of one or more augmented reality markers 206 to a desired augmented reality marker 206 using a touchpad, scroll ball or wheel, a tab key, or the like; or any other approach consistent with the capabilities of the mobile device 102 and the user interface provided by the local client shopping application 110. Referring to the examples of FIG. 2A, FIG. 2B, and FIG. 2C, a consumer user could select a specific shoe from all of the shoes shown in the augmented reality view 202 that have an associated augmented reality marker 206. An augmented reality marker as described herein can include any kind of visible on-screen symbol or groups of symbols that indicate that a specific item 210 is available for selection by a consumer user to reveal more information. Such augmented reality markers can also include one or more additional types of information, such as for example pricing, brand information, availability in the retail location (as opposed to only available for shipping to a consumer), etc.

Performing this action based on the augmented reality view 202 shown in the examples of FIG. 2A, FIG. 2B, and FIG. 2C can cause the user interface of the local client shopping application 110 to display an information screen relating to the selected item 302 (in this case a specific shoe). The information screen, which can also be referred to as an item page, can optionally include one or more of identification information relating to the selected item 302; sizing information; user interface functionality that permits selection of a specific feature of the item (e.g. size or color or shape, etc.); user interface functionality for adding the item (optionally with additional sizing, quantity, color, shape, etc. information) to a shopping cart, watch list, or the like or, alternatively for buying the item immediately without use of a shopping cart; user interface functionality that supports sending information about the selected item 302 to another person; user interface functionality that supports sending a request for additional information (e.g. by e-mail, SMS message, entry to a social media site, direct message to a vendor or manufacturer or distributor, phone number dialing, etc.), user interface functionality that supports providing additional views of the selected item, optionally from multiple angles, as a three dimensional rotatable model, in different colors or sizes, etc.); user interface functionality that supports viewing of related items or suggested items (e.g. "if you are interested in this item, you might also be interested in this related item") either in the same retail location or in another retail location (optionally operated by a different commercial entity); or the like. User interface functionality as used herein relates to one or more of icons, links, images, buttons, text boxes, pull-down menus, or other user interface features that can receive input from a consumer user, for example by touch, entry of one or more keyboard characters, etc.

Figure 4:
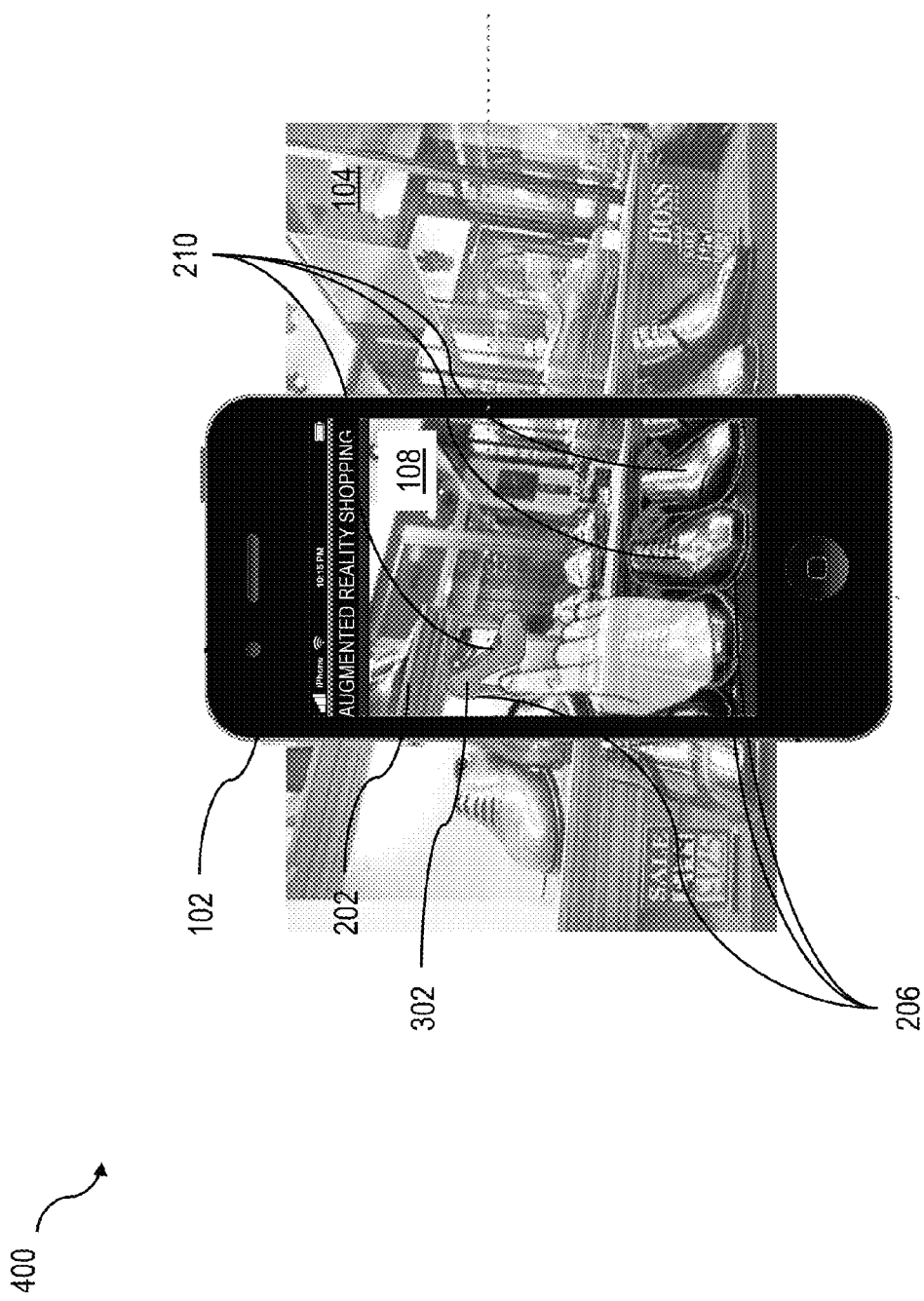
FIG. 4 is a screenshot of a local client shopping application showing features consistent with implementations of the current subject matter.

FIG. 4 through FIG. 8 show a series of screen flows 400, 500, 600, 650, 700, 800, illustrating features that can be present in one or more implementations of the current subject matter. In FIG. 4, the screen flow 400 illustrates another example of a mobile device 102 showing an augmented reality view 202 of a current view 204 of a shopping display 104 on the screen 108 of the mobile device. The augmented reality view 202 includes highlighted items 210 in the current view 204 of the shopping display 104 that are augmented by augmented reality markers 206, which in this example are highlighted outlines of the items 210. The mobile device 102 in the example of FIG. 4 through FIG. 9 includes a touch screen. A consumer user 110 can indicate a selected item 302 of the highlighted items 210 by tapping on the selected item 302 on the augmented reality view 204 shown on the screen 108.

Figure 5:
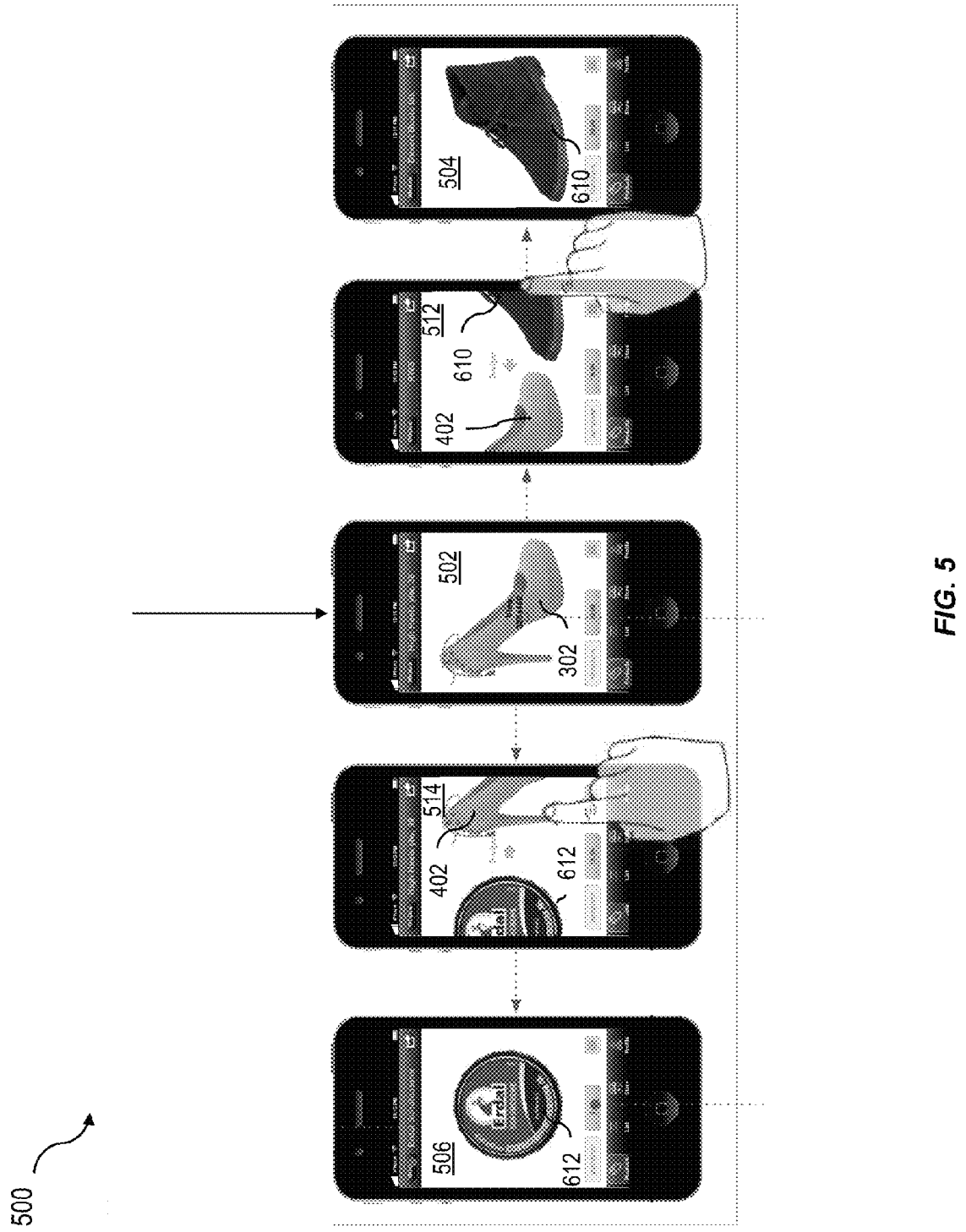
FIG. 5, FIG. 6A, FIG. 6B, FIG. 7, and FIG. 8 show a series of screenshots of a local client shopping application showing features consistent with implementations of the current subject matter.

Upon the consumer user performing the action illustrated in FIG. 4, the screen flow 500 of FIG. 5 can be accessed. Here, the screen flow 500 can be entered at a product screen 108, which can show a catalog or other view of the selected item 302 without the clutter of the current view 204 of the shopping display 104 present in the augmented reality view 202. Swiping of a finger (or optionally more than one finger, a stylus, etc. according to the user interface and operating system of the mobile device 102) to either side in the product screen 502 of the selected item 302 can transition to other product screens 504, 506 of other products 510, 512. Transition screens 514, 516 can include animated features to simulate moving from sequential pages in a catalog, or the like.

Figure 6B:
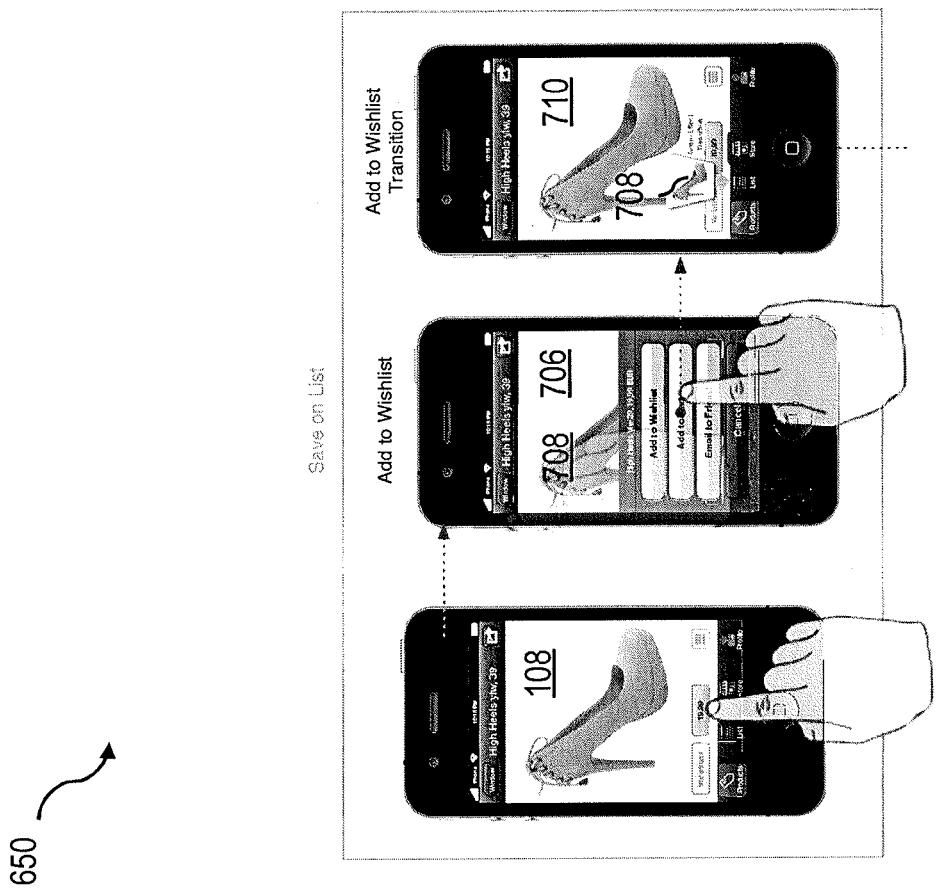
Figure 6A:
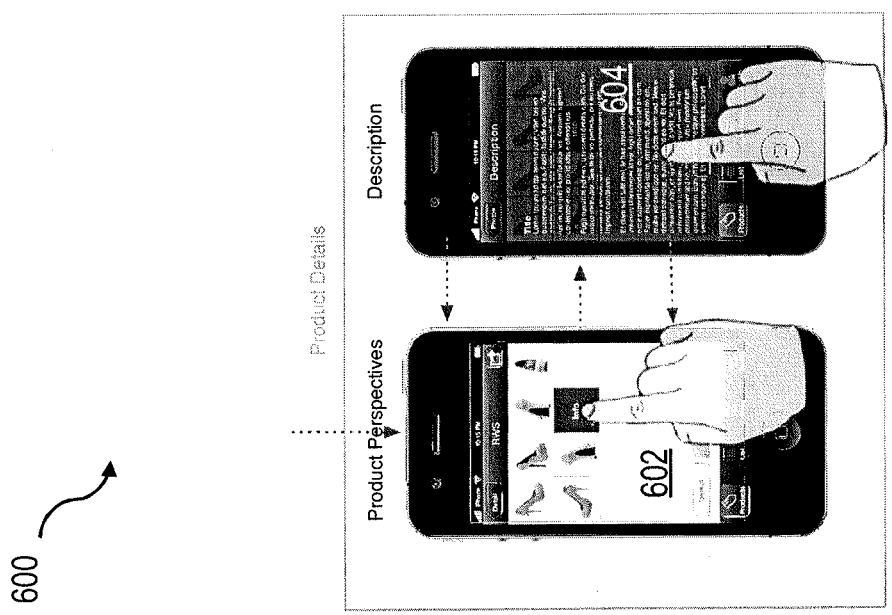

Movement of one or more fingers in a downward swiping motion from the product screen 502 can transition the user interface to show additional product detail as shown in the screen flow 600 of FIG. 6. For example additional views or perspectives as shown in a product perspectives screen 602 and product description text, etc. in a product description screen 604 can be accessed in this manner.

FIG. 6B shows a screen flow 650 illustrating an example of activation of wish list user interface functionality accessible from a product screen 602. Selection of an "add to wish list" or "add to interest list" button or the like in the product screen can transition to a wish list addition confirmation screen 606. Entering of a confirmatory action (e.g. pressing a button or the like) in the wish list addition confirmation screen 606 can add a wish list indicator 608 to a new version of the product screen 610. In this manner, a selected product (e.g. a good or service) selected via the augmented reality view 202 or via navigation of the user interface screens of the local client shopping application 110 to a product screen of a related item can be added to a persisted list that can be viewed by the consumer user, sent to or shared with other users or persons, or the like.

Figure 7:
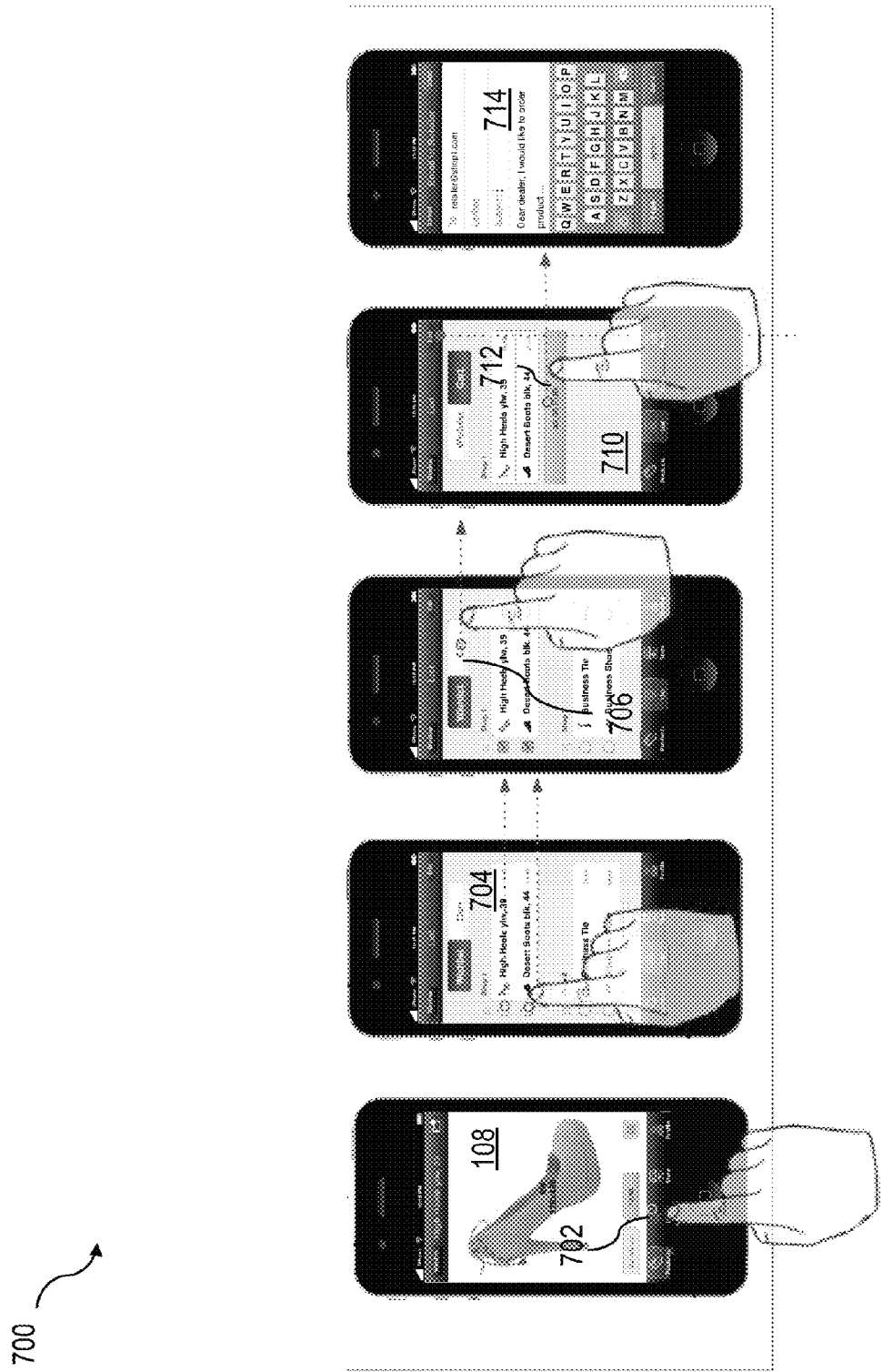

FIG. 7 shows a screen flow 700 illustrating an example of a purchase process. From a product screen 502, selection of a buy button or similar functionality 702 by the consumer user can cause the user interface to display a cart addition screen 704, in which a consumer user can choose to add or not add one or more items to a virtual shopping cart for current or later purchase. Selection of a cart button or similar functionality 706 form this cart addition screen 704 can cause the user interface to display a shopping cart screen 710 showing all or at least some of the items in the consumer user's shopping cart. If many items are present in the virtual shopping cart, it may be unfeasible to display them all at once within the limitations of the size of the screen 108, so scrolling or some other activity (e.g. moving to an additional cart page, etc.) may be necessary for the consumer user to view all items in the virtual shopping cart. In some implementations of the current subject matter, an augmented shopping approach can support small retailers who lack an e-commerce interface via which to receive and process orders. In these cases, clicking of a transaction execution button or other similar functionality 712 (e.g. a buy button, etc.) can cause the user interface to display a messaging screen 714 from which an e-mail or other message can be prepared and sent to the retailer requesting that the selected item be held for the consumer user to pick up, shipped to the consumer user, etc.

Figure 8:
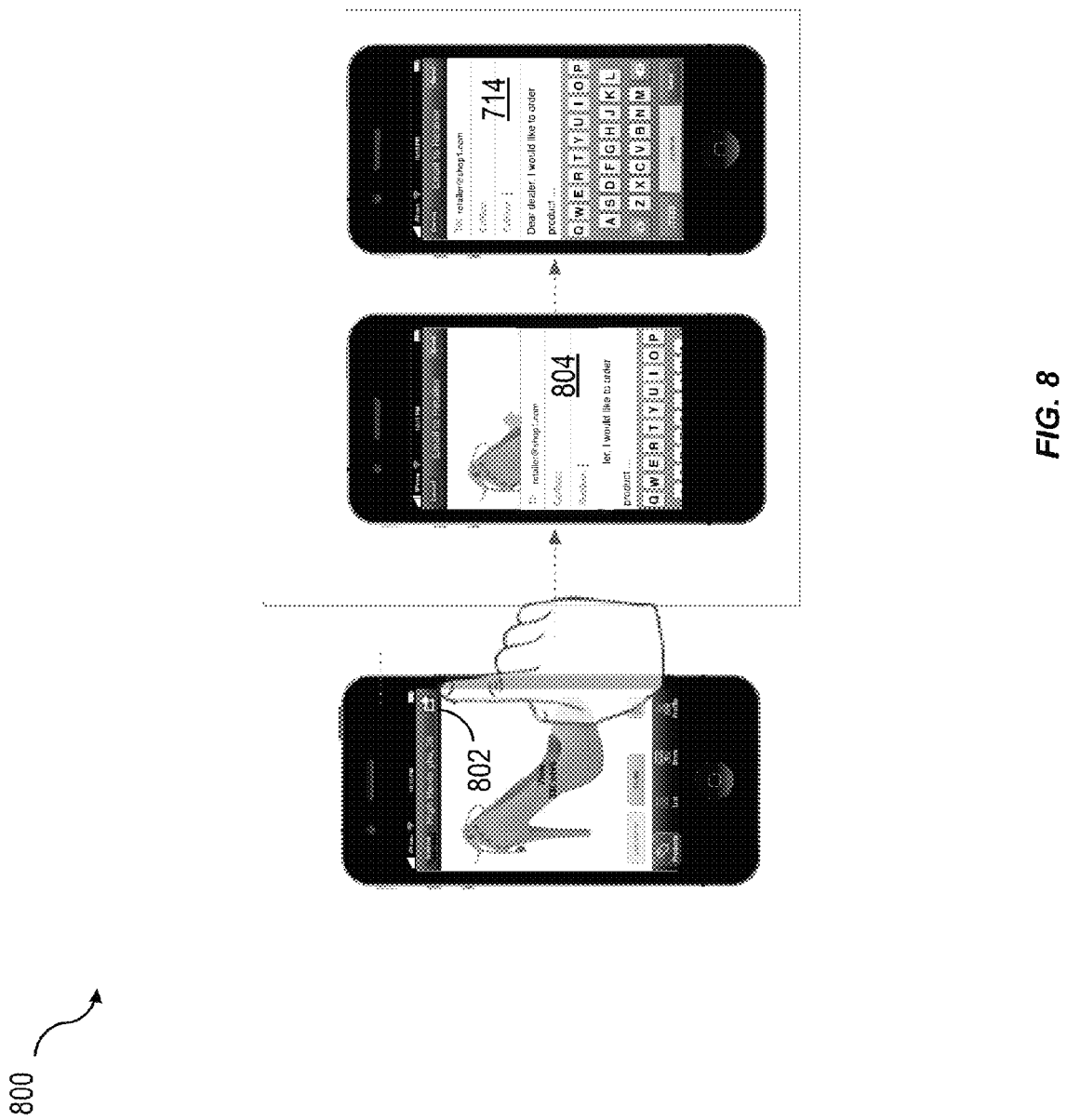

FIG. 8 shows a screen flow 900 illustrating an example of a purchase process in which a buy button 802 is accessed directly from a product screen 502. In this example, a messaging screen 714 can be displayed by the user interface, optionally via a transition screen 904 showing one or more animations or other user interface features.

Different participants in an augmented reality shopping program consistent with one or more implementations of the current subject matter can have differing roles. For example, a retailer 106 (or one or more persons associated with the retailer) can have roles including updating the first three dimensional model of the shopping display 104 after changes are made to the shopping display 104, scanning items (for example with a bar code scanner or the like) or otherwise entering data about the items and/or the goods or services they represent into a database accessible by the three dimensional models, assigning the items in the shopping display to pars of the first three dimensional model to update the second three dimensional model and assigning products in shopping window with bar code scanner, maintaining accurate data about the goods and services of the retail location and those represented in the shopping display 104, and maintaining inventory data about the goods and services of the retail location and those represented in the shopping display 104.

A local government or commerce organization or the like can set-up and maintain infrastructure components necessary for smooth operation of an augmented reality shopping approach within its area of influence or control. For example, logistic services can be provided for participating retailers. Such logistics services can optionally include one or more of picking up and shipping of purchased products, providing a central clearinghouse and/or related standardized processes for handling returns or refunds relating to purchased goods or services that the customer no longer wishes to retain, and providing additional value-added services. Additional value-added services can include assistance with preparing the required three dimensional shopping display models, for example by providing hardware necessary to gather the necessary input images of a shopping display 104 of a retailer 106. The local government or commerce organization or the like can also provide or support databases and other data collection activities relating to market analytics and the like.

In some implementations of the current subject matter, product information can be maintained, for example by a person or person associated with a retailer 106 via a retailer portal program. A retailer portal program can optionally be a thin client (e.g. web browser or the like that accesses a web application provided over a communications network 112 from an augmented reality shopping backend 114. Implementations of the current subject matter, the augmented reality shopping backend 114 can include one or more features of an enterprise resource planning (ERP) program or other business software architecture. As noted above, this augmented reality shopping backend 114 can serve as a content provider driving information provided by the local client shopping application 110 at a mobile device 102 used by a consumer user.

With a mobile device 102, a consumer user can be enabled to search for products or services, for example using a mobile version of a search engine such Google, Bing, Yahoo, or the like. Search engines such as these generally show links of companies or other commercial entities that have advertised goods, services, or the like that are similar to or otherwise linked to goods, services, other products, or the like for which a consumer user has searched (for example as demonstrated by entry of one or more search terms, selection of one or more search results, or the like).

A retail backend 116 of a commercial entity operating a physical location that links or otherwise makes available for synchronization one or more inventory databases 126 or other inventory information to an augmented reality shopping backend 114 can optionally push links to be advertised on websites of these search engine website such that upon selection of such a link by a consumer user, the local client shopping application 110 can open with relevant product(s) on the consumer user mobile device 102. In this manner, a retailer 106 can directly advertise goods or services available for purchase etc. via links from the augmented reality shopping backend 114 onto a search engine website without requiring the services of a third party developer for this integration.

In an implementation of the current subject matter, an augmented reality shopping backend 114 (e.g. an ERP system or other business architecture) can feature one or more "mash-up" screens that can be integrated with results pages of search engine websites. A retailer 106 can choose one or more products, services etc. from its inventory to be advertised on the search engines. To do so can include opening up this mash-up screen on the augmented reality shopping backend 114 and choosing the desired search engine(s). In general, a retailer would likely require a respective accounts with these search engine providers to be able to push such advertisements. In an example of operation consistent with this implementation of the current subject matter a person associated with the retailer 106 can access an advertising portal of the search engine and follow the processes relevant for that particular search engine for bidding/raising campaigns against that item(s) to be advertised. All of these operations can be supported from within the augmented reality shopping backend 114, which can also identify and only specific roles of employees or other persons associated with the retailer 106 to perform such tasks. This integration between ERP systems and search engines is possible with the help of API(s) provide by the search engines, such as for example the AdWords API from Google, Inc. (Mountain View, Calif.), AdCenter API from Microsoft Corp. (Redmond, Wash.) for Bing, and the like. A person associated with a retailer 106 can provide a desired link and, depending on the platform from which it is selected by the consumer, the relevant version of the local client shopping application can be opened or launched on the mobile device 102 of the consumer user.

In an example of the use of mash-up screens to enhance customer traffic to a retailer 106, a person associated with the retailer 106 can access a feature within the retailer portal through which one or more products (e.g. goods or services) are maintained. A "mash-up" screen can also be maintained for each product for integration with search engines (e.g. Google, Bing). Such a mash-up screen can be loaded with one or more pre-set queries for the corresponding product and can be changed as necessary, for example by the person associated with the retailer 106 using the retailer portal, to reflect changes in product details. Consistent with certain implementations of the current subject matter, An augmented reality shopping backend 114 can provide to the retailer 106 (e.g. to a person associated with the retailer 106 via a retailer portal, by e-mail, or the like) information about products viewed by consumer users of the local client shopping application 110. Such information can optionally be in the form of reports, which can include a variety of data regarding consumer user activities, optionally organized in a number of ways. As an example, reports based on time of day (e.g. morning or afternoon or evening, closing time or open time, etc.), relative or absolute placement of items in the shopping display 104, age of the current configuration of the shopping display 104 (e.g. time since the last update of the shopping display 104), and the like. The augmented reality shopping backend 114 can also provide to the retailer 106 (e.g. to a person associated with the retailer 106 via a retailer portal, by e-mail, or the like) information about consumer users of the local client shopping application 110 who have selected a "contact me" feature regarding one or more products viewed by the consume user via the local client shopping application 110. Such information can assist a retailer 106 in making direct contact with a prospective customer by providing more information about the product and convert the prospect into to a customer. This approach can assist the retailer 106 in reducing the number of potential sales that might be lost, for example after closing time or to customers who choose to window shop without entering the store. The augmented reality shopping backend 114 can also provide to the retailer 106 (e.g. to a person associated with the retailer 106 via a retailer portal, by e-mail, or the like) information about consumer users of the local client shopping application 110 who have added one or more products (e.g. goods or services, etc.) offered by the retailer or the retailer itself into an "interested" list using the local client shopping application 110. This feature can enable the retailer to run campaigns, provide discount information and other information related to the interested items directly to the consumer user, or perform other targeted activities that are more likely to drive further sales.

Information provided by the augmented reality shopping backend 114 can optionally include demographic information about one or more consumer users (if such information is authorized by the consumer user and applicable laws and regulations to be shared) who have viewed, shown interest in, etc. a retailer and/or products available from the retailer 106. This could help a retailer to understand better about customers, products which are of greatest (or least, etc.) interest to customers, the age group of customer and run the store business with better focus. By accumulating data for registered users of the local client shopping application of required user registration, the local client shopping application 110 can assist in identifying the consumer/user of the app and thereby in understanding the needs and behavior of consumers. This approach can advantageously combine information regarding consumer movement profiles and information about products purchased, saved for later purchase or requests as gifts, recommended to friends or acquaintances, linked to via social media sites, or the like. The technological components required to support use of systems and methods consistent with implementations of the current subject matter can be significantly less expensive than currently available approaches, such as for example interactive shopping displays based on fixed sensor and display hardware.

A local government or commerce organization can in some implementations of the current subject matter be the responsible party for administering an ERP system or other system providing content or other support as part of an augmented reality shopping backend 114 system, for example via a cloud computing arrangement. Content that can be provided by a local government or commerce organization can include, but is not limited to information on places of interest on shopping, gastronomy, and other services that are available within the a region of interest. Based on usage data reflecting use of a local client shopping application 110 by consumer users, an augmented reality shopping backend 114 can generate reports that include data such as types of retailers 106 that are experiencing customer traffic, sales, etc.; the demographics of the consumer users making use of the local client shopping application 110 in an area of interest; locations within an area that are most, least, etc. frequently visited by consumer users making use of the local client shopping application 110 (e.g. based on GPS information or other mobile device location information assuming it is shared by consumer users; and the like.

Activation of the local client shopping application 110 on a mobile device 102 can be an optional operation, as it is possible that a mobile device can include at least some aspects of the local client shopping application 110 integrated directly into an operating system of the mobile device 102. Alternatively, if a consumer user has previously used the local client shopping application 110 and has not exited (e.g. terminated, closed, etc.) the local client shopping application 110, it may not be necessary to activate the local client shopping application 110 each time it is used.

A local client shopping application 110 can optionally include features allowing a consumer user to view all products sold by a particular retailer 106, and this capability can be accessible from either the augmented reality view 204 or from a product screen for a specific product or service (for example a screen that shows a rotatable image of the product). It can also be possible for a consumer user to view products or services available from the retailer 106 sorted by specific criteria such as product category, price range, inventory status, currently on sale, etc. A consumer user can also view information regarding similar retailers with locations in the vicinity of the current location of the consumer user, within a that particular geographic area (e.g. a town, city, region, etc.) that sell the same product or similar products and also view navigation directions to the other retailer location (for example using integration with a mapping feature on the mobile device 102).

A consumer user can add a retailer 106, a retailer location, etc. to an 'Interested' list using the local client shopping application 110. Once added, the user will be able to see all the products currently being sold by the store, view offers or campaigns running against any product sold by that store at any time the seller provide this information, view comments from social networking websites such as Facebook, Twitter, Google+, etc. A consumer user can also use the local client shopping application 110 to reserve a product (e.g. a good or a service) and purchase it a later convenient time. This reservation may or may not be charged based on applicable guidelines prescribed according to the product or the retailer 106.

The local client shopping application 110 can allow payment processes for purchases made by a consumer user by integrating with one or more existing payment gateways or methods (e.g. mPayments 365 from SAP SyBase, Google wallet, Paypal, debit from a bank account, charge to a credit card, or the like). A consumer user can track the location of a product shipped from a retailer 106 from within the local client shopping application 110 provided that retailer 106 participates in this feature by making available the required tracking information relating to shipped parcels.

Using the local client shopping application 110 a consumer user can create and store a pre-approved payment method (for example using one of the payment gateways or methods mentioned above or other payment methods) and optionally an amount that can be applied against purchases in a given geographical area, a specific retailer 106, or the like. As an example, a parent or other person can pre-approve or otherwise designate a certain amount that can be spent by that person or by another consumer user of the person's choosing using the local client shopping application 110. In this way the person or the other consumer user of the person's choosing can make quick purchases when a product is chosen. This feature can be used to make a gift or otherwise control spending. In the case that the pre-approved or otherwise designated amount is not enough to make a desired purchase, any outstanding amount required to complete the transaction can be made up with another form of payment (e.g. a credit card, cash, checking account transfer, online payment services, etc.).

Upon a good or service (e.g. a product) being purchased, the local client shopping application 110 can allow a consumer user to provide a comment or other feedback (e.g. a "like") regarding the product and/or the retailer 106, for example via one or more social networks. Such feedback can also be shared with the retailer 106. A consumer user can also be able, using the local client shopping application 110, to share information of a product or retailer 106 to other users of the local client shopping application 110 on respective mobile devices 102 in addition to other platforms for which related applications (such as for example an app on a smart or networked television set or set-top box, a webapp or other Web application such as those available from Google Inc. for its Chrome browser) to the local client shopping application 110 are available. Consumer users of the related applications can be enabled to view the complete details shared by the initiating consumer user and can proceed to perform shopping functions relating to products or retailer. As such devices are not mobile, the augmented reality shopping functions would not be enabled via the related applications.

Purchases and transactions made by the consumer user can be available for the consumer user to access via the local client shopping application 110 regardless of the consumer user's current location. This feature can facilitate the consumer user approaching or otherwise contacting the retailer 106 for any after-sales services.

Many game developers are utilizing the concept of in-game advertising to advertise real world merchandise. In other implementations of the current subject matter, in-game advertising can be linked with features of an augmented reality shopping program. For example, a consumer user who is also a player of video games can, on purchase of a game sold by a game developer that participates in an augmented reality shopping program, be asked to register his or her augmented reality shopping account with the game during the initial setup of the game. During gameplay, when the consumer user views a product or other display (e.g. a billboard or other in-game product placement or advertising) marketing merchandise advertised by a company or other advertiser cooperating with the game developer, a relevant gaming platform key can appear to allow the consumer user to convey interest in the advertised product. Upon the consumer user selecting, activating, etc. the relevant gaming platform key, information can be sent, for example by or via an augmented reality shopping backend 114 to the local client shopping application 110 on a mobile device 102 of the consumer user. The consumer user can continue playing the game without any disruption. However, upon subsequently opening or activating the local client shopping application 110, details of the product, goods, services, etc. whose relevant gaming platform keys were selected or activated by the consumer user can be shown in the local client shopping application 110 along with one or more locations of retailers 106 (e.g. locations of one or more closest retailers 106) from which the selected product, good, service, etc. can be obtained by the consumer user. The consumer user can be enabled to perform any of the above-described functions relating to operation of the local client shopping application.

Implementations of the current subject matter can also include features of a consumer incentive system, which can be used in association with an offering of a local client shopping application 110 and associated features supported by an augmented reality shopping backend 114. In one example, a consumer user can accumulate points or other rewards metrics based on a number or value of purchases made by the consumer user or other activities performed by the consumer user. Other activities that result in awarding of points or other rewards metrics to a consumer user can optionally include frequent usage of a local client shopping application in association with stores or other retail locations within a specific area; use of a local client shopping application to create wish lists, watch lists, or the like that lead to later purchases by the consumer user or by other consumer users; referrals to other consumer users to add and use the local client shopping application; completing various social media activities associated with the local client shopping application (e.g. "liking" the local client shopping application or its associated loyalty or rewards programs or the like; mentioning the local client shopping application or its associated loyalty or rewards programs in a social media posting such as Twitter, Facebook, LinkedIn, Google+, or the like; etc.).

Consistent with implementations of the current subject matter, when a consumer user utilizes a local client shopping application 110 on a mobile device 102 to make use of one or more features consistent with implementations of the current subject matter, for example to purchase one or more desired products (e.g. goods or services), a customer loyalty or other reward account associated with the consumer can be credited with points (or other award metrics) to be awarded. The points or other reward metrics accumulated by a consumer user can optionally be segregated based on the given area (e.g. a city, a town, a region, etc.) in which the points or other reward metrics were earned (e.g. where the activities performed by the consumer user to accumulate the points or other reward metrics occurred). The points or other reward metrics earned by the consumer user in a first region or area can be restricted such that those points or other reward metrics from the first region cannot be directly used in a second region or area. Additionally, points or other reward metrics accumulated in two separate regions or areas cannot be directly combined. Rather, one or more mechanisms, algorithms, approaches, or the like can be provided consistent with implementations of the current subject matter to support transferring of points or other reward metrics from region to region, between two consumer users, or the like.

As an example, points or other reward metrics accumulated by a consumer user in city A cannot be directly utilized (e.g. redeemed, benefited from, etc.) in city B. However, the consumer user can participate in a transfer operation to make some of the points or other reward metrics accumulated in city A available for use in city B. A certain percentage, a fixed amount, or the like of the points or other reward metrics being transferred from city A to city B can be deducted as a transaction tax or penalty such that the consumer user has at least some added incentive to make use of his or her points or other reward metrics in the area in which he or she has accumulated them and to continue to accumulate additional points or other reward metrics in that same area as those newly accumulated points or other reward metrics would not be subject to the transaction tax or penalty that is applied to points or other reward metrics accumulated in another area and then combined with the points or other reward metrics accumulated in the first area. A consumer user can also be able to transfer points to another consumer at a certain percentage of the points being transferred Unlike conventional approaches in which a customer loyalty program or other shopping rewards program is typically tied to a specific retailer or chain of retailers, an implementation of the current subject matter can include allowing a consumer user to accumulate points or other rewards metrics through shopping and purchasing activities across a larger group of otherwise unrelated stores or other retailers or service providers. In an example, a local chamber of commerce or commerce club, trade association, local government, or the like can make use of a geographic-based rewards or points system to encourage customers to shop in a given area and in particular to make use of a local client shopping application. Points or other rewards metrics accumulated by a consumer user can be used at multiple retailers, stores, service providers, etc. in the given area and can optionally be usable outside of the given area. Redemption of points or other rewards metrics can optionally include one or more of service or product discounts, free items or services, invitation to preferred shopper events access to bonus content provided via the local client shopping application or other applications executable on a mobile device or computer, etc., and the like. A consumer user can also be enabled to share his or her accumulated points or other rewards metrics with other consumer users and/or to use his or her accumulated points or other rewards metrics in an area outside of the given area where the accumulated points or other rewards metrics were earned. One or more algorithms, conversions, discounts, deductions, or the like can optionally be applied to such transactions such that accumulated points or other rewards metrics have the most value for redemption by a customer when the accumulated points or other rewards metrics are redeemed for products, services, rewards, or the like by the consumer who earned them through his or her activities and in the given area where they were earned. Such features can encourage broader use and acceptance of a local client shopping application and its associated backend features both by additional consumers in a given area and by the consumer and additional consumers in other geographic areas.

In an implementation of this aspect of the current subject matter, purchases or other activities by a consumer user can result in accumulation by the consumer user of the points or other rewards metrics at a rate that varies with a current or recent level of activity by the consumer user in purchasing or other activities. In other words, the more the consumer user purchases from retailers of a city or within some other specified geographical area within a specific time frame, the more points the user can earns per transaction or unit value of goods and services made within that city. As an example, a consumer user utilizes the local client shopping application 110 to make purchases from New York for the first time. For this first transaction the consumer user earns 2 points every $100 (or some other ratio of points earned per unit of currency spent at an initial rate). If the consumer user continues to make purchases at a rate more frequent than every 2 days (or some other time interval) using the local client shopping application 110, the points earned per dollar spent can increase by a pre-set accelerator factor for each subsequent transaction until a maximum earning rate for points earnable per $100 is reached. If the consumer user fails to make any purchase within the prescribed time period to earn the additional points per $100, the accelerator factor can be reduced until the rate of points earning returns to the initial rate (e.g. 2 points per $100). The initial incentive earning rate as well as the accelerator factor and the maximum earning rate can be set by a commerce club, chamber of commerce, relevant city center offices representing the interests of the retailers, or by some agreement among a group of two or more retailers 106.

Figure 9:
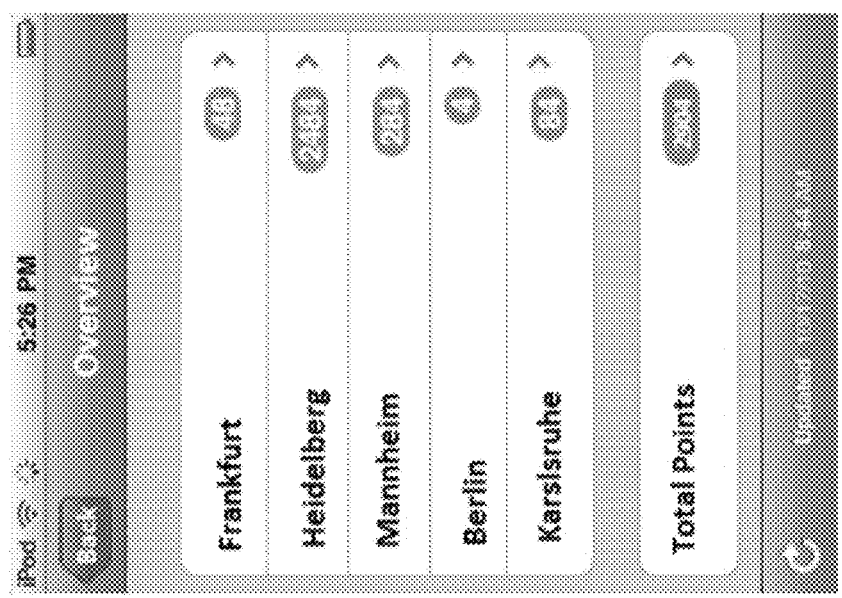
FIG. 9, FIG. 10, and FIG. 11 show screenshots of a local client shopping application showing features associated with tracking of loyalty points.

Other than simply purchasing products (e.g. goods or services) with the loyalty points earned from shopping, loyalty points can be utilized in additional among ways among one or more consumer users. As an example, three colleagues who are in different regions of a country and in different countries can include Joseph and Frank, who reside in Germany, and Daniel, who resides in India. In this example, Joseph lives in the southwest of Germany and has done shopping in most of the major cities in that region and has earned points for his shopping activities with the local client shopping application 110. The example screenshot 900 of FIG. 9 illustrates an option for displaying loyalty points earned by a consumer user in multiple geographic areas. Assuming that Joseph lives in Heidelberg, a town in southwest Germany, he could transfer all his points from his shopping activities in Frankfurt and Karlsruhe (two other cities in the same part of Germany). On transferring of these points, however, Joseph would forfeit a regional transfer penalty that can include a percentage of his earned points being transferred. In other words, on transferring from a first region to a second region, more points can be deducted from the consumer user's total in the first region than are added to the consumer user's total in the second region. In an example, the regional transfer penalty can be in a range of 15% to 25% of the points transferred. This penalty can be imposed as a means to encourage a consumer user to earn points by use of the local client shopping application 110 even when he or she is shopping in an area outside of his or her area of residence. However, as the points were earned by the consumer user's activities that benefited retailers in another area, the local retailers desire a tax or penalty on redemption of loyalty points earned elsewhere that might be redeemed by them.

Figure 10:
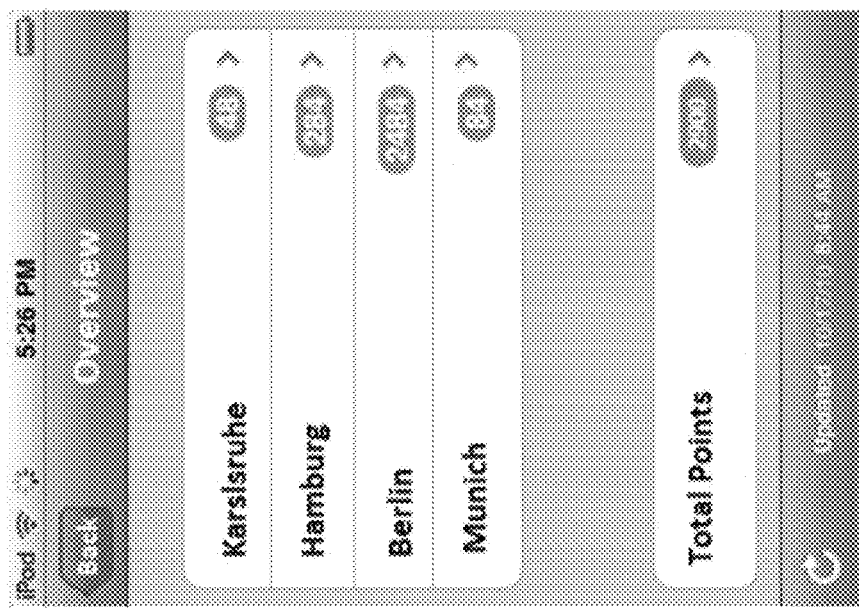

Continuing with the above example, Frank lives in Berlin and has done most of his shopping there. The example screenshot 1000 of FIG. 10 illustrates a display of Frank's loyalty points totals in multiple geographic areas. Joseph visits the Berlin office during a week where his birthday falls and Frank decides to give Joseph a gift him by providing points that Frank had earned from shopping in Berlin. A transfer penalty can be imposed such that the number of points Joseph receives is not equal to the number of points deducted from Frank's account. In some examples, the inter-consumer transfer penalty can be in a range of 5% to 10% of the total points transferred (e.g. smaller than transfer penalty for a consumer user moving points earned in one region into another region. The business in Berlin in this case is not lost, but moved to another user and still utilized within the source city, Berlin.

Figure 11:
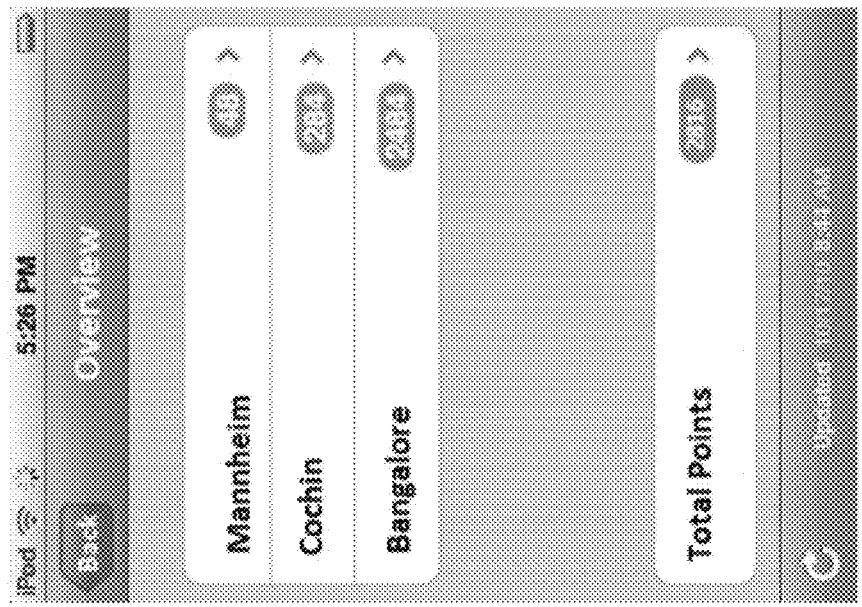

Continuing with the above example, Frank and Joseph visit Bangalore, India where Daniel lives. Daniel also uses the local client shopping application 110 in Bangalore. The example screenshot 1100 of FIG. 11 illustrates a display of Daniel's loyalty points totals in multiple geographic areas. As it is the first time for Frank and Joseph to India, they decide to travel across southern India. Knowing this, Daniel can give Frank and Joseph a gift of some or all of the points he has previously earned in Cochin and Bangalore to Frank and Joseph. This transfer of points can be subject to the inter-consumer transfer penalty discussed above. Frank and Joseph can optionally be unable to move these points or other points earned in India through their shopping activities using the local client shopping application 110 in India to other cities in regions with a differing currency. For example, the currency unit differs between Germany and India and the valuation and items that can be bought in Germany and India with the points are different. The points earned by Frank and Joseph using the local client shopping application 110 can nonetheless be retained for use in the future when they return to India. Alternatively, either Frank or Joseph could transfer some points back to Daniel, again with the inter-consumer transfer penalty imposed.

A retailer 106 and/or a person associated with a retailer 106 can benefit from being able to offer potential customers the advantageous features of a traditional shopping window or shopping display in a city center, mall, outlet mall, or other area experiencing a substantial amount of foot traffic (e.g. a large variety of stores and goods, ability to try and touch products, etc.) combined with those associated with electronic commerce (e.g. the ability to browse, share and buy an item from any location; convenient home delivery options, or the like). Using a local client shopping application 110, a consumer user can use a mobile device 102 to identify and select a product from a shopping display 104 in order to purchase that product; add the product to a shopping cart, watch list, or the like; search for other related or similar products, etc.

In some implementations of the current subject matter, one or more interested entities, including a retailer 106 with a physical location (e.g. a shop owner with a storefront window), a local commerce club or organization, vendors, suppliers, or the like of goods and services can desire to understand consumer behavior with regard to a number of issues. For example, it can be useful to know what are the preferred shopping display, retailer location, etc. of a group of consumers in a given town or shopping area. It can also be useful to understand pedestrian traffic flow between stores and other retailer locations in a given area (e.g. the routes taken, the average time spent in front of a given window, or the like) as well as the duration of a consumer's attention being directed at a given product in a shopping window or perhaps which product in the store had the largest amount of attention from a single or multiple potential buyers. A retailer 106 may also wish to obtain realistic, rapid, dynamic feedback regarding the effects of product placements and types of displays in a shopping display 104, which products are most likely to be placed onto a potential buyer's watch list or shopping cart, which products are most frequently shared with friends or within social networks, which products are most frequently or least frequently purchased directly using a local client shopping application 110 or the like, which products were purchased at a later time after being added to a shopping cart or watch list via a local client shopping application 110 or the like, demographic or other information (e.g. sex, age, etc.) about potential customers who visit a shopping display (e.g. a storefront window display) and whether there is any difference in the distribution of potential customer characteristics by time of day (e.g. between times that the store is or is not open for business), day of the week, seasons, holiday periods, and the like.

Data or other information regarding these aspects of potential customer behavior can be a valuable asset that can enable an interested entity to improve its marketing activities. Consumer research has become an ever more important field of activity, in which specialized firms invest a significant amount of money to gain consumer insights through interviews, observation, long-term panels, and the like. The key factors influencing a buying decision can be particularly difficult to understand. The current state of the art in studying such key factors can involve the use of expensive eye-tracking system. However, such approaches are generally far too expensive for small retailers, who often have very narrow profit margins.

Use of a local client shopping application 110 consistent with implementations of the current subject matter can enable collection and usage of very useful data that can be aggregated and analyzed to address the needs noted above. For example, usage by a consumer user of a local client shopping application 110 can lead to generation of a significant amount of tracking data that can be accessed via a web server, for example an augmented reality shopping backend 114 providing one or more features of a relational database system or a business software architecture such as an enterprise resource planning (ERP) application. Such data can include, but are not limited to identification of the user of the local client shopping application 110 (e.g. the potential consumer) and other user data such as age, sex, e-mail address, physical location, shopping preferences, or the like. Additional data can be accumulated as the user or consumer uses the local client shopping application 110. For example, a record can be kept of the retailer locations, and other locations visited by the local client shopping application 110. This physical location information can be based on one or more of GPS or other location determining information obtained directly from a component on the mobile device 102, from a location lookup based on a QR code or other visual code or the like that can be used to identify a store location, an identification of a 3D model of a store front display requested from the web server, or the like.

Consistent with implementations of the current subject matter, a determination can be made of an item available for purchase or an item, sign, display, or the like representing an item (or an item representing a good or service) that a consumer user can purchase, that the consumer user has viewed or otherwise selected as part of a request for further information, to initiate a purchase, or the like. A determination of what the consumer user is interested in can be determined in one or more of several possible ways. For example, the subject of the consumer user's attention can be determined using one or more of data generated by a motion sensor or other functionality of a mobile device that provides an orientation and direction in which the an associated camera device is directed, a location sensor such as a global positioning system (GPS) transceiver or the like (e.g. position determination using one or more fixed radio beacons such as cell towers, etc.), data generated by a solid state compass device or the like associated with a mobile device, etc.

By accumulating data for registered users of the local client shopping application 110 of, the local client shopping application 110 can assist in identifying a specific consumer user of the app and thereby in understanding the needs and behavior a group of consumer users. This approach can advantageously combine information regarding customer movement profiles and information about products purchased, saved for later purchase or requests as gifts, recommended to friends or acquaintances, linked to via social media sites, or the like. The technological components required to support use of systems and methods consistent with implementations of the current subject matter can be significantly less expensive than currently available approaches, such as for example interactive shopping displays based on fixed sensor and display hardware.

As discussed above, implementations of the current subject matter can include features relating to augmenting a view of real items (e.g. items for purchase or items representative of goods or services available to customers) in a shopping display 104 when a view of the shopping display 104 captured by a mobile device 102 of a consumer user is shown on a screen 108 of the mobile device 102. The augmenting 206 of the items 210 in the shopping display 104 can include, but is not limited to markers, outlines, shadow effects, shading, coloring, solid or dashed lines around a visible perimeter of an item, or the like to indicate to the consumer user that certain items in the view of the shopping display 104 are selectable by the consumer user via a user interface (which can optionally be a touch screen user interface on a smart phone) for the purposes of obtaining further information about the products visible in the shopping display 104, making purchases, requesting availability or pricing information, or the like.

In further implementations of the current subject matter, a consumer user can be enabled to browse, view, etc. similar virtual products available from the specific retailer 106, from other nearby retailers, elsewhere within a given geographic area, or the like. This feature can enable a retailer 106 to potentially capture additional sales from a customer who is unable (e.g. because the retailer 106 is not currently open for business) or unwilling (e.g. because the customer is too busy, too shy, etc.) to enter the retailer location. Also, while the ability of a consumer user to view offerings from other retailers 106 might be considered a potential route to directing sales away from a specific retailer 106, increasing the ease of customer transactions in a given geographic area can be a benefit for al members of a group of cooperating retailers 106 (e.g. as part of a local government initiative, a commerce club arrangement, or the like).

As noted above, a consumer user of a local client shopping application 110 executing on a mobile device 102 can view augmented reality additions to physical items that are present in a shopping display 104 being viewed using the mobile device screen 108 and camera. As used herein, the physical item can refer to an actual good that can be purchased or otherwise included in a transaction. Alternatively, the physical item can represent a good or service that can be purchased or otherwise included in a transaction. For ease of description, references herein to the physical item should be understood to refer interchangeably to either or both of these options unless such an interpretation is repugnant to the context within which this terminology is used.

Consistent with some implementations of the current subject matter, the augmented reality view 202 can also include images of items that are not actually physically present in the shopping display. In this manner, the shopping display 104 can be augmented not just with augmented reality markers 206 for actual products present in the shopping display 104 but with images of products that are not actually present. As an example, very expensive products (e.g. mechanical watches, jewelry, high end electronics devices, or the like) that are kept in a more secure location that a shopping display 106 can be added to the augmented reality view 202 that a consumer user can view when using the local client shopping application 110 in view of the shopping display 104. Additionally, similar products (e.g. shoes) but with a different color that are available within the same store or other retailer can be added to the augmented reality view 202 without needing to be present in the physical shopping display 104. Related products from other retailers in the same town or from a chain store can also optionally be added to the augmented reality view 202. The additions to an augmented reality view 202 displayed to a specific consumer user can be tailored to that consumer user, for example based on prior purchases, a purchasing pattern, interest of the consumer user in other related goods or services, etc.

A user experience such as can be provided using the augmented reality shopping approaches discussed herein can require the use of certain technology elements as well as various preparation and use techniques. Technology elements can include an electronic device that is able to capture a three dimensional model of a shopping display 104. In one example, this device can be a three dimensional camera such as the Kinect™ product available from Microsoft (Redmond, Wash.). A digital camera capable of taking high quality pictures of dedicated products in the shopping display 106 can also be employed. If the three dimensional camera is capable of taking the necessary high quality pictures of the product in the shopping display 104 in addition to its three dimensional functions, a single device can perform both of these two camera functions. A software application, which can in some examples be a web application hosted on an augmented reality shopping display configuration system 130, can merge the captured 3D model with the high resolution pictures and a web server to store the result of this effort. A mobile device 102, for example one owned or user by a consumer user can have a touch-screen, an integrated cam to capture 2D pictures, and one or more sensory input systems for determining location (e.g. via GPS) and orientation (e.g. a solid state compass, accelerometer, etc.). A mobile data link (e.g. over a wireless network 112) can provide a connection between the mobile device 102 and a web server (e.g. an augmented reality shopping display configuration 130) that retains and provides the 3D model. The local client shopping application 110 running on the mobile device 102 can process and render the data from the camera of the mobile device 102 with the received augmented three dimensional model.

After changing, updating, or otherwise preparing a new shopping display 104, a person associated with the retailer can capture a three dimensional model of the shopping display 104 and also capture high quality pictures of products inside the shopping display 104 and additional products to be made available in an augmented reality view 202 of the shopping display 104. The person associated with the retailer can then, using the software application mentioned in the preceding paragraph, use one or more user interface tools and approaches to relate the three dimensional model and the high resolution pictures of products in the shopping display 104. For example, a user interface screen of the software application can include two panes: one containing representations of products (e.g. from a store catalog or inventory list) and the other containing a view on the three dimensional picture. In this manner, for example through dragging and dropping, clicking, etc. additional products can be positioned or related to the augmented three dimensional model of the shopping display 104 and stored on a web server.

When a consumer user is in view of the shopping display 104, he or she can use a mobile device 102 to view an augmented reality view 202 of the shopping display 104. To do so, the mobile device 102 can be activated (e.g. switched on, awakened from sleep, transitioned into an active mode, etc.). An identification of a correct augmented three dimensional model associated with the shopping display 104 can be made, for example by one or more approaches to determining where the mobile device 102 is located and what direction its camera is pointed. The correct augmented three dimensional model can be identified in some examples using geo-data (e.g. GPS) information to determine the current position. Alternatively the consumer user can scan a QR-code sticker in or on the shopping display 104 (for example on a window in front of the shopping display 104) to identify the shopping display 104 and to access the corresponding augmented three dimensional model on the web server. Launching, starting, or otherwise activating the local client shopping application 110 on the mobile device 102 can cause the camera of the mobile device 102 to be activated so that an image of the shopping display 104 can be captured.

The captured image or video sequence can be sent to the web server (e.g. the augmented reality shopping display configuration system 130) where a software application can determine the current position of the camera relative to the shopping display 104 by mapping the transmitted image or images with nodes and edges of the augmented three dimensional model of the shopping display 104. The web server can reply over the communication network 112 with a relatively small set of data to augment the image of the shopping display 104 with additional products or information to create an augmented reality view of the shopping display. The mobile device 102 can use its own sensors to react to any movement of the consumer user with his mobile device 102 that can affect the view of the shopping display 104 being shown on the screen 108 and thereby update the augmented reality image 202 accordingly. The consumer user can then continue to see and select augmented products on the screen 108 of the mobile device 102 beside the products that are tangible in the shopping display 104. The consumer user can also readily easily zoom-in, tab through, select, etc. the desired products in the shopping display to perform further shopping-related activities.

Implementations of the current subject matter also include one or more features relating to construction of an augmented three dimensional model of a shopping display 104 that can be used to augment a two dimensional image of the shopping display 104 viewed by a camera of a mobile device 102 such that the screen 108 of the mobile device 102 shows the two dimensional image with added augmented reality markers 206 associated with items 210 shown in the two dimensional image.

In implementations of the current subject matter, image recognition (such as for example random sample consensus or RANSAC) analysis can be combined with geo-location data or other data indicating a position of a mobile device to estimate a position and pose of a camera device associated with the mobile device. In implementations of the current subject matter, a location of the mobile device 102 can be determined as well as a direction and angle in which the camera of the mobile device 102 (hereinafter referred to as a "mobile device camera") is directed, a vertical height of the mobile device 102, and the like. One or more of such parameters can be used to determine how a two dimensional augmented reality shopping view 202 displayed to the user by the screen 108 of the mobile device 102 is properly mapped to an augmented three dimensional model of a specific shopping display 104 at which the mobile device camera is directed.

In practice, the process of presenting a corrected augmented reality view 202 of a shopping display 104 to a consumer user can include operations such as estimating a current location of the mobile device 102, accessing a video stream or image generated by a digital camera associated with the mobile device, using the acquired data plus data provided by an augmented three dimensional model to compute camera parameters including a camera pose and direction; using the computed camera parameters to select data from the augmented three dimensional model which are then provided to the mobile device 102; rendering the selected data into a two dimensional image, and blending the two dimensional image into video being captured by the mobile camera device for presentation to the consumer user on the screen 108 of the mobile device.

The augmented three dimensional model that can be used in providing an augmented reality window shopping experience via a consumer user's mobile device can include a "real world" model and augmentation information to support added functionality when overlaid on the images of a shopping display 104 captured by a mobile device camera. The real world model can be a model captured from the shopping display, for example using a three dimensional camera as discussed above. The real world model can exist in a suitable pre-processed form either on a server or on the mobile device 102. Which parts and which extent of the model will reside on the server and which on the mobile device 102 can depend on computational power of the mobile device and on bandwidth limitations for communication with the server.

The augmentation information can be part of a model that will be projected and blended into the real world image collected by the mobile device camera. Location data regarding the current location mobile device 102 can be used for lookup of the appropriate augmented three dimensional model, for example by querying a real world three dimensional model database to determine potential shopping displays near the current location of the mobile device 102. This process can be helpful in reducing the need to compare as much data in matching the received image of the shopping display 104 to an augmented three dimensional model by limiting the search to only augmented three dimensional models that are close to the current mobile device location.

Computer vision algorithms, for example using six degrees of freedom, can be used for estimating the pose of the mobile device camera relative to the real world model (e.g. RANSAC). One or more of accelerometer and compass sensors of the mobile device can be used to narrow down the available degrees of freedom to, for example, only three degrees of freedom to speed up the process. The estimated camera pose can be used to compute a two dimensional projection of the augmented three dimensional model. From this projection, the points of interest" that will be visible in the final picture can be retrieved. The up to date data for these points (e.g. price, size, availability, short text) can also be retrieved from a product database. The augmentation data can be rendered into a two dimensional picture for presentation to the consumer user via the mobile device screen 108. If the data is desired to look like a three dimensional object, it can be virtually rendered it into a three dimensional model, which can be projected to two dimensional according to the computed camera pose. If the desired data is instead intended to look like an overlay, it can be directly rendered into the two dimensional pictures, for example at coordinates derived from the three dimensional model. Finally, the computed results are alpha blended into the video stream produced by the mobile device camera to present the augmented reality shopping view 202.

FIG. 12 through FIG. 15 show a process flow diagrams 1200, 1300, 1400, and 1500 illustrating features of methods consistent with some implementations of the current subject matter. One or more of the features described in the following paragraphs can appear in various combinations consistent with the scope of the current subject matter.

Figure 12:
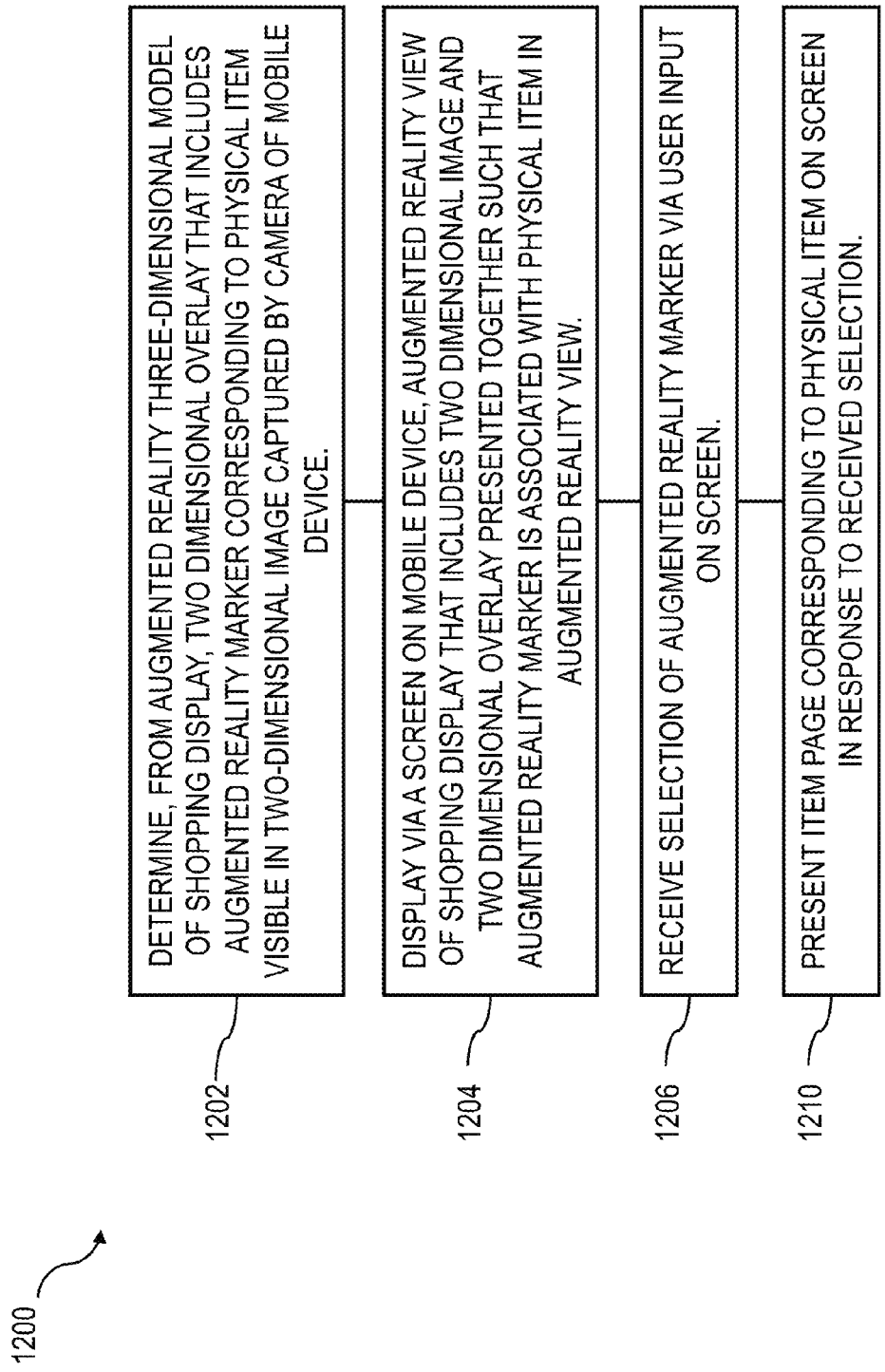
FIG. 12 is a process flow diagram illustrating aspects of methods having one or more features consistent with implementations of the current subject matter.

As shown in the flow chart 1200 of FIG. 12, at 1202, a two dimensional overlay that includes an augmented reality marker corresponding to a physical item visible in a two dimensional image of a shopping display captured by a camera of a mobile device is determined from an augmented reality three dimensional model of shopping display. Via a screen on the mobile device, an augmented reality view is displayed at 1204. The augmented reality view includes a view of the shopping display that includes the two dimensional image and the two dimensional overlay presented together such that the augmented reality marker is associated with the physical item in the augmented reality view. At 1206, a selection of the augmented reality marker is received via a user input on the screen, and at 1210 an item page corresponding to the physical item is presented on the screen of the mobile device in response to the received selection. The item page includes additional information about at least one of the physical item and a good or service represented by the physical item.

Figure 13:
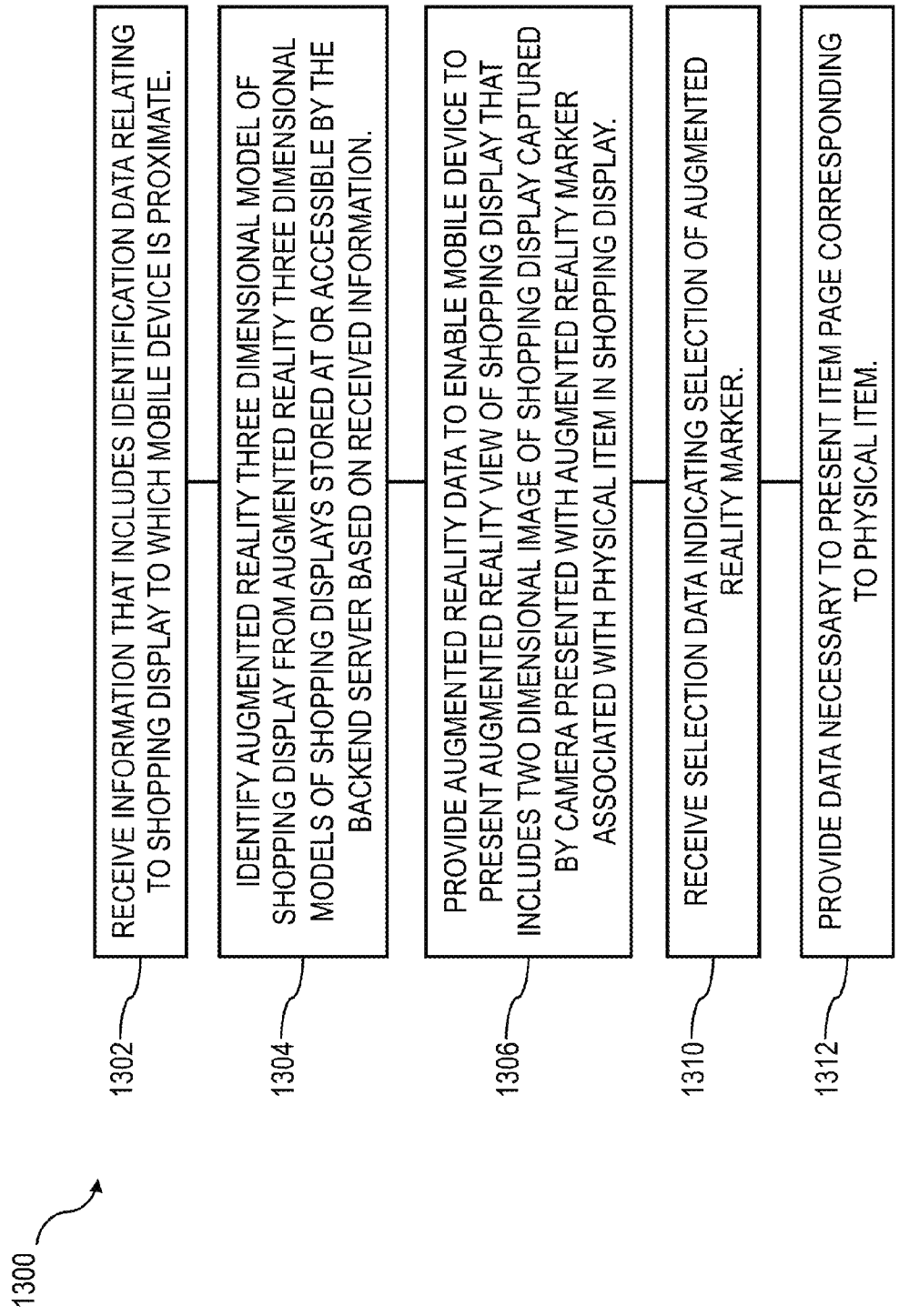
FIG. 13 is a process flow diagram illustrating aspects of other methods having one or more features consistent with implementations of the current subject matter.

As shown in the flow chart 1300 of FIG. 13, at 1302, information is received from a mobile device over a data connection. The information includes identification data relating to a shopping display to which a mobile device is proximate. Based on the received information, at 1304 an augmented reality three dimensional model of the shopping display is identified from a plurality of augmented reality three dimensional models of shopping displays stored at or accessible by the backend server. Augmented reality data are provided to the mobile device over the data connection at 1306 to enable the mobile device to present an augmented reality view of the shopping display on a screen of the mobile device. The augmented reality view includes a two dimensional image of the shopping display captured by a camera associated with the mobile device presented concurrently with a two dimensional overlay such that an augmented reality marker in the two dimensional overlay is associated with a physical item in the shopping display. At 1310, selection data indicating selection of the augmented reality marker are received from the mobile device over the data connection, and at 1312, data necessary to present an item page corresponding to the physical item are provided to the mobile device over the data connection in response to the received selection.

Figure 14:
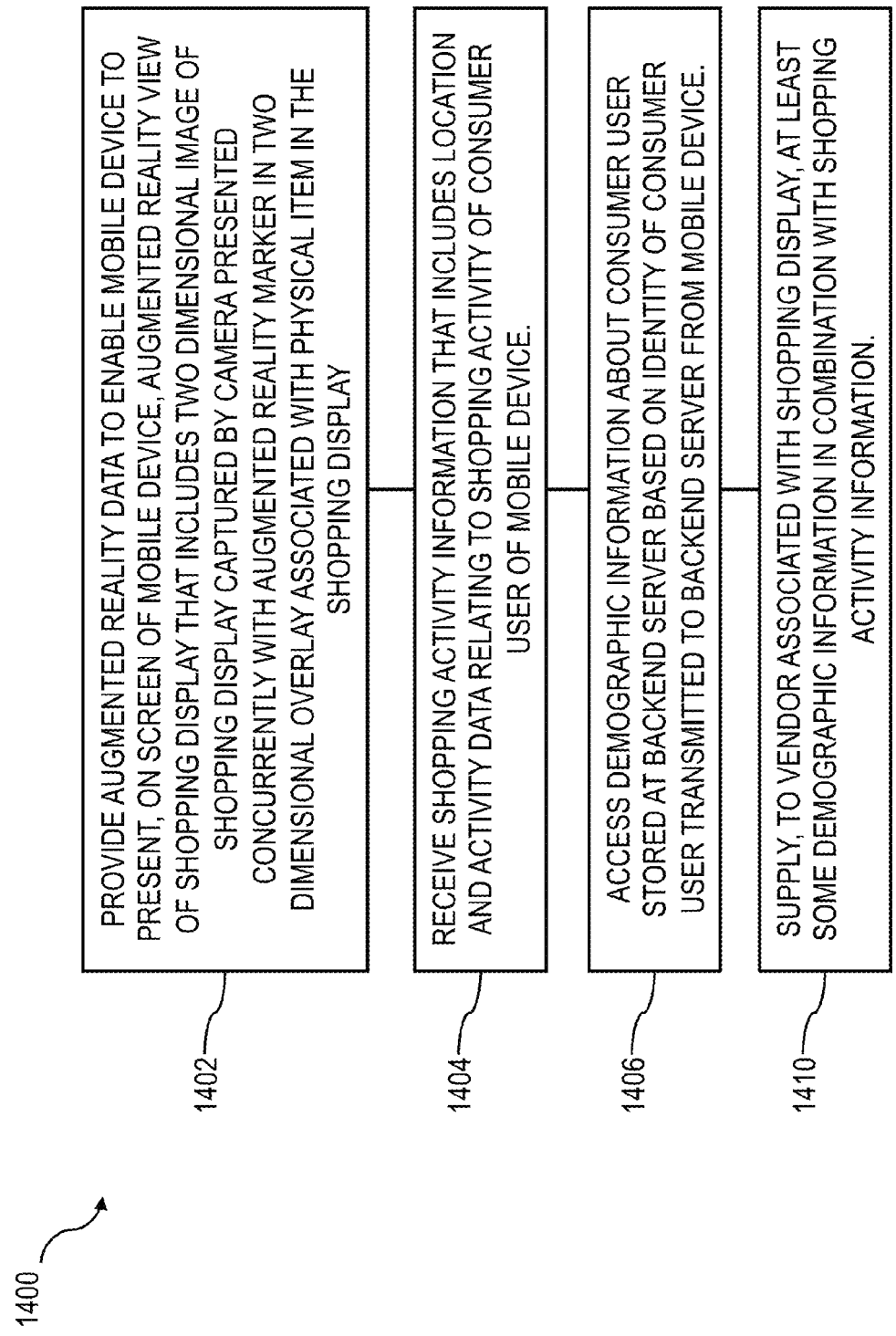
FIG. 14 is a process flow diagram illustrating aspects of other methods having one or more features consistent with implementations of the current subject matter.

As shown in the flow chart 1400 of FIG. 14, at 1402, augmented reality data are provided via a backend server to a mobile device to enable the mobile device to present an augmented reality view of a shopping display on a screen of the mobile device. The augmented reality view includes a two dimensional image of the shopping display captured by a camera associated with the mobile device presented concurrently with a two dimensional overlay such that an augmented reality marker in the two dimensional overlay is associated with a physical item in the shopping display. At 1404, shopping activity information including location and activity data relating to a shopping activity of a consumer user of the mobile device are received at the backend server. The location data include a location at which a shopping activity is performed by the consumer user using the local client shopping application on the mobile device. Demographic information about the consumer user stored at the backend server are accessed at 1406 based on an identity of the consumer user transmitted to the backend server from the mobile device, and at least some of the demographic information is supplied at 1410 in combination with the shopping activity information to a vendor associated with the shopping display.

Figure 15:
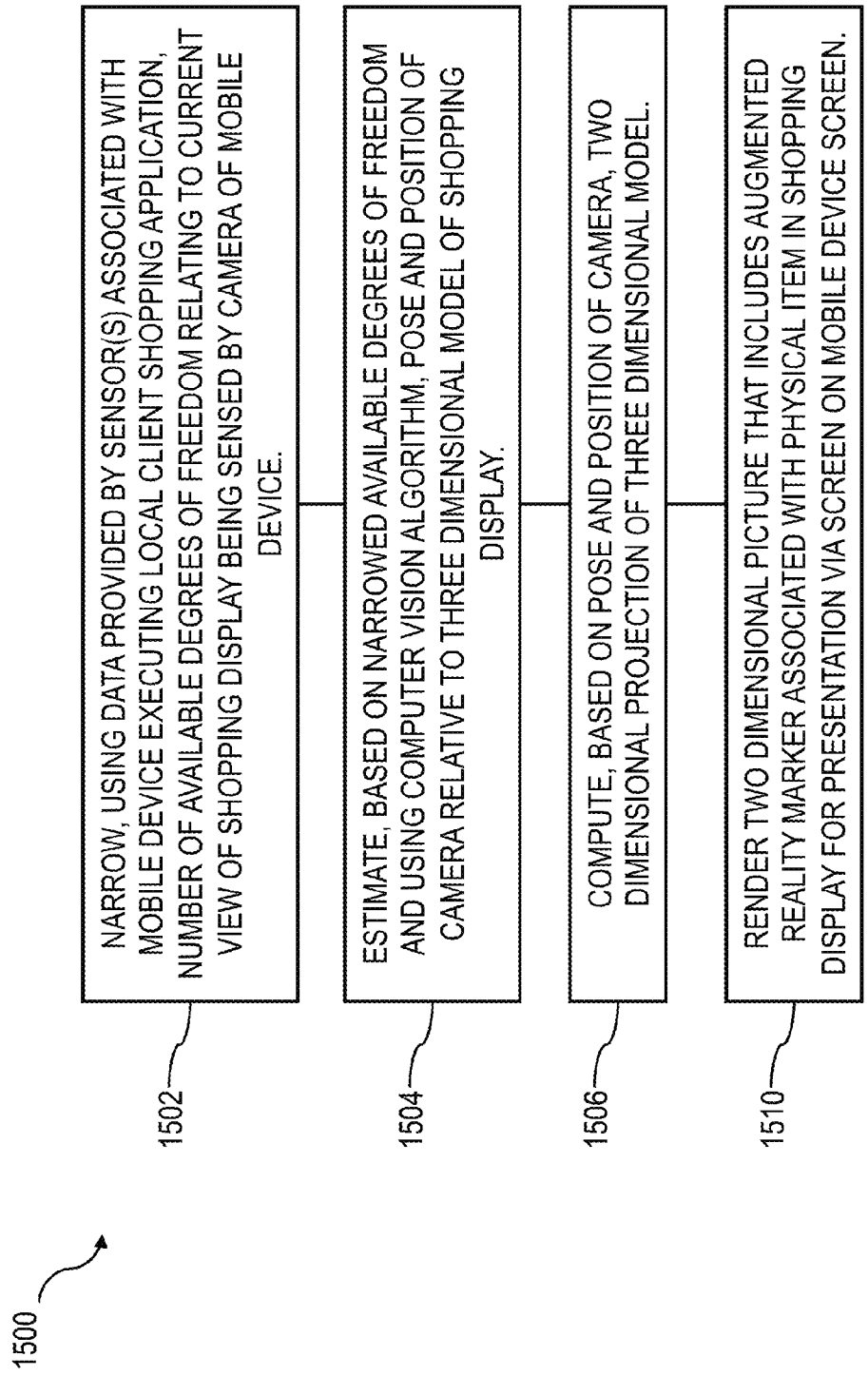
FIG. 15 is a process flow diagram illustrating aspects of other methods having one or more features consistent with implementations of the current subject matter.

As shown in the flow chart 1500 of FIG. 15, at 1502 a number of available degrees of freedom relating to a current view of a shopping display being sensed by a camera of a mobile device executing a local client shopping application is narrowed using data provided by one or more sensors associated with the mobile device. At 1504, based on the narrowed available degrees of freedom and using a computer vision algorithm, a pose and position of the camera relative to a three dimensional model of a shopping display are estimated. Based on the pose and position of the camera, at 1506 a two dimensional projection of the three dimensional model is computed, and at 1510, a two dimensional picture is rendered for presentation via a screen on the mobile device screen. The two dimensional picture includes an augmented reality marker associated with a physical item in the shopping display.

Implementations of the current subject matter can potentially provide advantages to traditional retailers and store owners, for example by allowing such entities to better compete with online marketplaces and other electronic commerce sellers. Based on demographic data that can be obtained from users of a mobile application, an entity (e.g. a retailer a chamber of commerce, or some other interested party) can design marketing campaigns, promotions, or the like to better target desired customers. For example, demographic data can be used, possibly in combination with other sets of data, to identify classes or groups of potential customers who are most likely generate a significant amount of revenue in a type of store, an area, a time of day or week, or according to one or more other parameters. Groups or classes of potential customers can be based on one or more factors, which can include without limitation any of age, sex, area of residence, shopping history, data obtained from social media profiles, income level, occupation, or the like. Based on such information, entities can be enabled to be allocate resources in increasing the attractiveness of store displays, shopping areas of a city or town, or the like; in planning, marketing, etc. events such as entertainment, special offers, or the like; and other techniques or approaches designed to appeal to customers in general and optionally more specifically to potential customers identified as more likely to generate larger revenues for stores and other entities in an area at a specific time.

Implementations of the current subject matter can provide one or more potential benefits, the descriptions of which provided herein are intended to be illustrative and not limiting in any way. Retailers or other commercial entities who operate physical shopping locations where goods, services, or the like are offered for sale, lease, rental, or the like to customers can realize benefits from implementations of the current subject matter, as can the customers or consumer users on the other end of such transactions. Other entities, for example, city or town governments, local chambers of commerce or commerce clubs, or the like can also benefit from features provided by implementations of the current subject matter.

For a commercial entity operator of a physical shopping location using one or more features similar to those described herein, it can be possible to realize revenue opportunities that might otherwise be lost to other shopping outlets such as "big Box" stores with longer hours, online commerce portals, or the like. The hours during which the commercial entity operator of a physical shopping location can be "open for business" can be increased beyond the period during which sales staff are paid. Some towns, cities, states, countries, etc. have existing laws that prohibit stores from remaining open indefinitely. Features consistent with implementations of the current subject matter can overcome this problem by converting a carefully crafted, attractive storefront or other shopping display into part of an online portal that supports customer inquiries, purchases, or the like even when the physical location is not open for business. New customers can be enticed to visit the retail location during working hours by features such as the ability to reserve an item for later pick up. Additional potential customer traffic can increase opportunities for cross-selling of other goods or services or of enticing still more new customers if the initial customer brings a companion (friend, family member, co-worker, etc.) while making a pick-up. A commercial entity operator of a physical shopping location can also benefit from the ability to obtain customer information, for example from a registered consumer user who browses, buys, reserves, recommends, etc. goods or services while using augmented reality shopping features on his or her mobile device. Additionally, the capital costs to a commercial entity operator of a physical shopping location to configure and maintain an online commerce presence can be substantially reduced by reliance on a pre-existing backend infrastructure to provide the engine for electronic transactions and on an existing physical shopping display controlled by the commercial entity operator of a physical shopping location to serve as the front end portal that drives potential customer traffic.

For consumer users of one or more features similar to those described herein, it can be possible to avoid the frustration of visiting a retail location after closing time and being unable to complete a transaction despite seeing an time of interest in a shopping display (e.g. a storefront display window). Rather than requiring a subsequent visit to the retail location to complete a transaction, a consumer user can leverage augmented reality shopping capabilities tied to the retail location and implemented directly on the consumer user's own mobile device. It can also be possible for as consumer user to realize discounts or other incentives (e.g. shopper loyalty program benefits or the like) offered by a retailer or by many retailers without the hassle of keeping track of coupons or multiple offers from multiple retailers. A consumer user can also be incentivized through use of one or more features similar to those described herein to spend more time strolling or window shopping in a city center or other area with shopping displays with which he or she can interact to experience the benefits of online shopping (e.g. immediate access to inventory, ability to obtain more information about a good or service, shipping options to facilitate remote delivery, unlimited shopping hours, etc.) while being able to view a concrete example of the item being purchased potentially in a more social setting (e.g. out with friends, family, etc. after a dinner or other social outing) than typical electronic commerce options provide.

For a city or town government, local chambers of commerce or commerce clubs, or the like, features consistent with one or more implementations of the current subject matter can assist in increasing the attractiveness of local retail establishments and other commercial entities through innovative software functionality executable on mobile devices owned or used by consumer users. A city or town government, local chambers of commerce or commerce clubs, or the like (e.g. a government or commerce organization) can therefore choose to cover one or more expenses associated with implementing an augmented-reality shopping approach to foster a more receptive commercial environment in its city center or other shopping area. Doing so can allow the government or commerce organization assist local commercialize the given advantages of a shop window over an anonymous web-shop. This approach can provide advantages such as superior visual impression, shop beside shop diversity, a relaxed shopping atmosphere through surrounding bars and restaurants, providing added value for club members (e.g. picking and shipping of ordered goods), gaining valuable market research data, and the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    receiving, at a processor from a mobile device executing a local client shopping application, sensor data generated by one or more sensors associated with the mobile device;
    narrowing, at the processor using the sensor data generated by the one or more sensors, a number of available degrees of freedom relating to a current view of a shopping display being sensed by a camera of the mobile device;
    estimating, at the processor based on the narrowed available degrees of freedom and using a computer vision algorithm, a pose and position of the camera relative to a three dimensional model of a shopping display;
    computing, at the processor based on the pose and position of the camera, a two dimensional projection of the three dimensional model;
    augmenting, at the processor based on the two dimensional projection, a two dimensional picture comprising an augmented reality marker associated with a physical item in the shopping display; and
    transmitting the two dimensional picture to a mobile device for presentation on a screen of the mobile device.

2. A computer program product as in claim 1, wherein the one or more sensors comprise a sensor selected from a group consisting of a radio signal triangulation sensor, a global positioning transceiver, a compass sensor, and an accelerometer sensor.

3. A computer program product as in claim 1, wherein the operations further comprise:
    identifying, based on the sensor data provided by the one or more sensors, a most likely shopping display being viewed through a camera associated with the mobile device; and
    determining the three dimensional model of the shopping display.

4. A computer program product as in claim 1, wherein the operations further comprise: identifying the shopping display based on a visual or textual encoding of a location code entered into the mobile device via the camera or a textual interface on the mobile device.

5. A computer program product as in claim 1, wherein the operations further comprise: presenting, via the screen, the two dimensional picture.

6. A computer program product as in claim 1, wherein the operations further comprise:
    receiving, via a user input, a selection of the augmented reality marker; and
    presenting, on the screen of the mobile device in response to the received selection, an item page corresponding to the physical item, the item page comprising additional information about at least one of the physical item and a good or service represented by the physical item.

7. A system comprising:
    computer hardware configured to perform operations comprising:
    receiving, at a processor from a mobile device executing a local client shopping application, sensor data generated by one or more sensors associated with the mobile device;
    narrowing, at the processor using the sensor data generated by the one or more sensors, a number of available degrees of freedom relating to a current view of a shopping display being sensed by a camera of the mobile device;
    estimating, at the processor based on the narrowed available degrees of freedom and using a computer vision algorithm, a pose and position of the camera relative to a three dimensional model of a shopping display;
    computing, at the processor based on the pose and position of the camera, a two dimensional projection of the three dimensional model;
    augmenting, at the processor based on the two dimensional projection, a two dimensional picture comprising an augmented reality marker associated with a physical item in the shopping display; and
    transmitting the two dimensional picture to a mobile device for presentation on a screen of the mobile device.

8. A system as in claim 7, wherein the one or more sensors comprise a sensor selected from a group consisting of a radio signal triangulation sensor, a global positioning transceiver, a compass sensor, and an accelerometer sensor.

9. A system as in claim 7, wherein the operations further comprise:
    identifying, based on the sensor data provided by the one or more sensors, a most likely shopping display being viewed through a camera associated with the mobile device; and
    determining the three dimensional model of the shopping display.

10. A system as in claim 7, wherein the operations further comprise:

identifying the shopping display based on a visual or textual encoding of a location code entered into the mobile device via the camera or a textual interface on the mobile device.

11. A system as in claim 7, wherein the operations further comprise: presenting, via the screen, the two dimensional picture.

12. A computer program product as in claim 7, wherein the operations further comprise:
- receiving, via a user input, a selection of the augmented reality marker; and
- presenting, on the screen of the mobile device in response to the received selection, an item page corresponding to the physical item, the item page comprising additional information about at least one of the physical item and a good or service represented by the physical item.

13. A computer-implemented method comprising:
- receiving, at a processor from a mobile device executing a local client shopping application, sensor data generated by one or more sensors associated with the mobile device;
- narrowing, at the processor using the sensor data generated by the one or more sensors, a number of available degrees of freedom relating to a current view of a shopping display being sensed by a camera of the mobile device;
- estimating, at the processor based on the narrowed available degrees of freedom and using a computer vision algorithm, a pose and position of the camera relative to a three dimensional model of a shopping display;
- computing, at the processor based on the pose and position of the camera, a two dimensional projection of the three dimensional model;
- augmenting, at the processor based on the two dimensional projection, a two dimensional picture comprising an augmented reality marker associated with a physical item in the shopping display; and
- transmitting the two dimensional picture to a mobile device for presentation on a screen of the mobile device.

14. A computer-implemented method as in claim 13, wherein the one or more sensors comprise a sensor selected from a group consisting of a radio signal triangulation sensor, a global positioning transceiver, a compass sensor, and an accelerometer sensor.

15. A computer-implemented method as in claim 13, further comprising:
- identifying, based on the sensor data provided by the one or more sensors, a most likely shopping display being viewed through a camera associated with the mobile device; and
- determining the three dimensional model of the shopping display.

16. A computer-implemented method as in claim 13, further comprising:
- identifying the shopping display based on a visual or textual encoding of a location code entered into the mobile device via the camera or a textual interface on the mobile device.

17. A computer-implemented method as in claim 13, wherein the operations further comprise: presenting, via the screen, the two dimensional picture.

18. A computer-implemented method as in claim 13, further comprising:
- receiving, via a user input, a selection of the augmented reality marker; and
- presenting, on the screen of the mobile device in response to the received selection, an item page corresponding to the physical item, the item page comprising additional information about at least one of the physical item and a good or service represented by the physical item.

19. A computer-implemented method as in claim 13, wherein at least one of the receiving, the narrowing, the estimating, the computing, the augmenting and the transmitting is performed by at least one programmable processor.

* * * * *